US011363593B2

(12) United States Patent
Sun et al.

(10) Patent No.: US 11,363,593 B2
(45) Date of Patent: Jun. 14, 2022

(54) WAVEFORM GENERATION IN MILLIMETER WAVE BAND WITH TIME DOMAIN IMPLEMENTATION

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 16/810,591

(22) Filed: Mar. 5, 2020

(65) Prior Publication Data
US 2020/0288465 A1 Sep. 10, 2020

Related U.S. Application Data

(60) Provisional application No. 62/816,010, filed on Mar. 8, 2019.

(51) Int. Cl.
*H04W 72/04* (2009.01)

(52) U.S. Cl.
CPC ..... *H04W 72/0446* (2013.01); *H04W 72/042* (2013.01)

(58) Field of Classification Search
CPC .................. H04W 72/0446; H04W 72/042
See application file for complete search history.

(56) References Cited

U.S. PATENT DOCUMENTS

2008/0304404 A1  12/2008  Lu et al.
2017/0231012 A1* 10/2017  Sung ................. H04W 74/08
(Continued)

FOREIGN PATENT DOCUMENTS

EP         3273737 A1    1/2018
WO    WO-2007033997 A1  3/2007

OTHER PUBLICATIONS

Farhang-Boroujeny B., et al., "Layering Techniques for Space-Time Communication in Multi-User Networks", Vehicular Technology Conference, 2003. 2003-FALL. 2003 IEEE 58th Orlando, FL, USA, Oct. 6-9, 2003, [IEEE Vehicular Technolgy Conference], Piscataway, NJ, USA, IEEE, US, Oct. 6, 2003 (Oct. 6, 2003), p. 1339, XP010700858, pp. 1339-1343, DOI: 10.1109/VETECF.2003.1285240 ISBN: 978-0-7803-7954-1 Abstract Sections I-III.
(Continued)

*Primary Examiner* — Ronald B Abelson
(74) *Attorney, Agent, or Firm* — Holland & Hart LLP

(57) ABSTRACT

Methods, systems, and devices for wireless communications are described. A waveform for communications between a user equipment (UE) and a base station may be generated or decoded based on a resource allocation of a slot for the communications. In some cases, the UE may receive control information from the base station that indicates the resource allocation for the slot, where the slot contains a defined number of symbol periods (e.g., 14 symbol periods), or the defined number of symbol periods and at least one additional symbol period. The waveform may then be generated (e.g., transmitted) or decoded (e.g., received) based on the number of symbol periods in the slot. Additionally or alternatively, the UE and base station may identify an operating mode of the UE, identify allowed resource allocation sizes for generating or decoding the waveform, and generate or decode
(Continued)

the waveform based on the allowed resource allocation sizes.

38 Claims, 19 Drawing Sheets

(56) References Cited

U.S. PATENT DOCUMENTS

2018/0124711 A1     5/2018   Hosseini et al.
2018/0331870 A1    11/2018   Sun et al.
2020/0221429 A1*    7/2020   Li ........................ H04W 72/04

OTHER PUBLICATIONS

International Search Report and Written Opinion—PCT/US2020/021478—ISA/EPO—dated Sep. 30, 2020.
Partial International Search Report—PCT/US2020/021478—ISA/EPO—dated Jun. 23, 2020.

* cited by examiner

WAVEFORM GENERATION IN MILLIMETER WAVE BAND WITH TIME DOMAIN IMPLEMENTATION

CROSS REFERENCE

The present application for patent claims the benefit of U.S. Provisional Patent Application No. 62/816,010 by Jing Sun et al., entitled "WAVEFORM GENERATION IN MILLIMETER WAVE BAND WITH TIME DOMAIN IMPLEMENTATION," filed Mar. 8, 2019, assigned to the assignee hereof, and expressly incorporated herein.

BACKGROUND

The following relates generally to wireless communications, and more specifically to waveform generation in millimeter wave (mmW) band with time domain implementation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations (e.g., a next-generation NodeB or giga-NodeB (either of which may be referred to as a gNB)) or network access nodes, each simultaneously supporting communication for multiple communication devices, which may be otherwise known as user equipment (UE). In some examples, base stations and UEs may generate waveforms including data, control, or reference signals. These waveforms may be single carrier waveforms. Existing techniques for generating and processing these waveforms and other types of waveforms may be lacking.

SUMMARY

The described techniques relate to improved methods, systems, devices, and apparatuses that support waveform generation in millimeter wave (mmW) band with time domain implementation. Generally, the described techniques provide for a user equipment (UE) or base station to generate or decode a waveform (e.g., a discrete Fourier transform spread orthogonal frequency division multiplexing (DFT-S-OFDM) waveform, a cyclic prefix orthogonal frequency domain multiplexing (CP-OFDM) waveform, etc.) for communications between each other based on a resource allocation of a slot for the communications. In some cases, the UE may receive control information from the base station that indicates the resource allocation for the slot, and the UE and base station may identify that the slot contains a defined number of symbol periods (e.g., 14 symbol periods) or that the slot contains the defined number of symbol periods with at least one additional symbol period (e.g., a partial symbol period, one full symbol period, multiple symbol periods, etc.). Accordingly, the UE and/or base station may then generate (e.g., transmit) and/or decode (e.g., receive) the waveform based on the number of symbol periods in the slot. Additionally, the UE and base station may identify the number of symbol periods in the slot based on a location of the slot within a defined number of slots configured for the communications (e.g., a cyclic time interval). For example, a first slot of the defined number of slots may include the defined number of symbol periods with the at least one additional symbol period, and the rest of the slots in the defined number of slots may include the defined number of symbol periods (e.g., without the at least one additional symbol period).

In some cases, each of the symbol periods of the defined number of symbol periods may include a first subcarrier spacing (SCS), and the at least one additional symbol period may include a second SCS that is the same or different than the first SCS. If the slot includes the defined number of symbol periods with the at least one additional symbol period, the at least one additional symbol period may occur at the beginning of the slot (e.g., before a beginning symbol period of the defined number of period symbols) or at the end of the slot (e.g., after a last symbol period of the defined number of period symbols). Additionally, the at least one additional symbol period may include a reference signal or a data transmission for the waveform. In some cases, the control information for the resource allocation may include a time domain resource allocation for the waveform generation or decoding. Accordingly, the UE or base station may interpret the time domain resource allocation based on the number of symbol periods in the slot.

Additionally or alternatively, the UE and base station may identify an operating mode of the UE, identify allowed resource allocation sizes for generating or decoding the waveform, and generate or decode the waveform based on the allowed resource allocation sizes. For example, different sets of resource allocations (e.g., of different sizes) may be used for the UE with different implementations (e.g., operating modes, such as time domain based implementations or DFT-S based implementations) of transmitters and receivers with a same waveform (e.g., a DFT-S-OFDM waveform). In some cases, the operating mode may include one or more transmitting or receiving modes that correspond to different algorithms for transmitting or receiving the same waveform. Additionally, the one or more transmitting or receiving modes may be supported by separate sets of allowed resource allocation sizes, where the separate sets of allowed resource allocation sizes may be subsets of each other or be different than each other. Accordingly, the UE and/or base station may then generate (e.g., transmit) and/or decode (e.g., receive) the waveform based on the implementation, the algorithm, the allowed resource allocation size, or a combination thereof corresponding to the operating mode.

A method of wireless communications by a UE is described. The method may include receiving control information indicating a resource allocation within a slot, identifying that the slot includes a defined number of symbol periods, or the defined number of slots and at least one additional symbol period, based on a position of the slot within a cyclic time interval that includes a defined number of slots, and transmitting or receiving a waveform within the slot.

An apparatus for wireless communications by a UE is described. The apparatus may include a processor, memory in electronic communication with the processor, and instructions stored in the memory. The instructions may be executable by the processor to cause the apparatus to receive control information indicating a resource allocation within a slot, to identify that the slot includes a defined number of symbol periods, or the defined number of slots and at least one additional symbol period, based on a position of the slot within a cyclic time interval that includes a defined number of slots, and to transmit or receive a waveform within the slot.

Another apparatus for wireless communications by a UE is described. The apparatus may include means for receiving control information indicating a resource allocation within a slot, means for identifying that the slot includes a defined number of symbol periods, or the defined number of slots and at least one additional symbol period, based on a position of the slot within a cyclic time interval that includes a defined number of slots, and means for transmitting or receiving a waveform within the slot.

A non-transitory computer-readable medium storing code for wireless communications by a UE is described. The code may include instructions executable by a processor to receive control information indicating a resource allocation within a slot, to identify that the slot includes a defined number of symbol periods, or the defined number of slots and at least one additional symbol period, based on a position of the slot within a cyclic time interval that includes a defined number of slots, and to transmit or receive a waveform within the slot.

In some examples of the method, apparatuses, and non-transitory computer-readable medium described herein, a first SCS may be used for the transmitting or receiving of each symbol period within the defined number of symbol periods, and a second SCS may be used for the transmitting or receiving of the at least one additional symbol period, where the first SCS and the second SCS are the same or different.

In some examples of the method, apparatuses, and non-transitory computer-readable medium described herein, transmitting or receiving the waveform within the slot further may include operations, features, means, or instructions for receiving the waveform within the slot and for decoding the waveform based on the identifying that the slot includes the defined number of symbol periods, or the defined number of symbol periods and the at least one additional symbol period.

In some examples of the method, apparatuses, and non-transitory computer-readable medium described herein, transmitting or receiving the waveform within the slot further may include operations, features, means, or instructions for generating the waveform based on the identifying that the slot includes the defined number of symbol periods, or the defined number of symbol period and the at least one additional symbol period, and for transmitting the waveform within the slot.

In some examples of the method, apparatuses, and non-transitory computer-readable medium described herein, the waveform may include a reference signal within the at least one additional symbol period.

In some examples of the method, apparatuses, and non-transitory computer-readable medium described herein, the waveform may include a data transmission within the at least one additional symbol period.

In some examples of the method, apparatuses, and non-transitory computer-readable medium described herein, the at least one additional symbol period may occur after a last symbol period of the defined number of symbol periods within the slot.

In some examples of the method, apparatuses, and non-transitory computer-readable medium described herein, the at least one additional symbol period may occur before a beginning symbol period of the defined number of symbol periods within the slot.

In some examples of the method, apparatuses, and non-transitory computer-readable medium described herein, the waveform may be a DFT-S-OFDM waveform or a CP-OFDM waveform.

In some examples of the method, apparatuses, and non-transitory computer-readable medium described herein, the control information indicating the resource allocation may include a time domain resource allocation for the transmitting or receiving, where the method, apparatuses, and non-transitory computer-readable medium described herein may further include operations, features, means, or instructions for interpreting the time domain resource allocation in the control information based on whether the slot is identified as including the defined number of symbol periods, or the defined number of symbol periods and the at least one additional symbol period.

A method of wireless communications by a UE is described. The method may include identifying an operating mode of the UE, identifying allowed resource allocation sizes for transmitting or receiving a waveform based on the operating mode, and transmitting or receiving a waveform to a wireless device based on the allowed resource allocation sizes.

An apparatus for wireless communications by a UE is described. The apparatus may include a processor, memory in electronic communication with the processor, and instructions stored in the memory. The instructions may be executable by the processor to cause the apparatus to identify an operating mode of the UE, to identify allowed resource allocation sizes for transmitting or receiving a waveform based on the operating mode, and to transmit or receive a waveform to a wireless device based on the allowed resource allocation sizes.

Another apparatus for wireless communications by a UE is described. The apparatus may include means for identifying an operating mode of the UE, means for identifying allowed resource allocation sizes for transmitting or receiving a waveform based on the operating mode, and means for transmitting or receiving a waveform to a wireless device based on the allowed resource allocation sizes.

A non-transitory computer-readable medium storing code for wireless communications by a UE is described. The code may include instructions executable by a processor to identify an operating mode of the UE, to identify allowed resource allocation sizes for transmitting or receiving a waveform based on the operating mode, and to transmit or receive a waveform to a wireless device based on the allowed resource allocation sizes.

In some examples of the method, apparatuses, and non-transitory computer-readable medium described herein, the UE operating mode may further include a first transmitting or receiving mode or a second transmitting or receiving mode, where the two transmitting or receiving modes correspond to different algorithms to transmit or receive a same waveform.

In some examples of the method, apparatuses, and non-transitory computer-readable medium described herein, a first set of allowed resource allocation sizes may be supported for the first transmitting or receiving mode, and a second set of allowed resource allocation sizes may be supported for the second transmitting or receiving mode.

In some examples of the method, apparatuses, and non-transitory computer-readable medium described herein, the second set of allowed resource allocation sizes may be a subset of the first set of allowed resource allocation sizes.

In some examples of the method, apparatuses, and non-transitory computer-readable medium described herein, the second set of allowed resource allocation sizes may be different than the first set of allowed resource allocation sizes.

In some examples of the method, apparatuses, and non-transitory computer-readable medium described herein, the UE operating mode may be a time domain mode or a DFT-S-OFDM mode, and the waveform may be a DFT-S-OFDM waveform.

A method of wireless communications by a base station is described. The method may include transmitting control information indicating a resource allocation within a slot, identifying that the slot includes a defined number of symbol periods, or the defined number of symbol periods and at least one additional symbol period, based on a position of the slot within a cyclic time interval that includes a defined number of slots, and transmitting or receiving a waveform within the slot.

An apparatus for wireless communications by a base station is described. The apparatus may include a processor, memory in electronic communication with the processor, and instructions stored in the memory. The instructions may be executable by the processor to cause the apparatus to transmit control information indicating a resource allocation within a slot, to identify that the slot includes a defined number of symbol periods, or the defined number of symbol periods and at least one additional symbol period, based on a position of the slot within a cyclic time interval that includes a defined number of slots, and to transmit or receive a waveform within the slot.

Another apparatus for wireless communications by a base station is described. The apparatus may include means for transmitting control information indicating a resource allocation within a slot, means for identifying that the slot includes a defined number of symbol periods, or the defined number of symbol periods and at least one additional symbol period, based on a position of the slot within a cyclic time interval that includes a defined number of slots, and means for transmitting or receiving a waveform within the slot.

A non-transitory computer-readable medium storing code for wireless communications by a base station is described. The code may include instructions executable by a processor to transmit control information indicating a resource allocation within a slot, to identify that the slot includes a defined number of symbol periods, or the defined number of symbol periods and at least one additional symbol period, based on a position of the slot within a cyclic time interval that includes a defined number of slots, and to transmit or receive a waveform within the slot.

In some examples of the method, apparatuses, and non-transitory computer-readable medium described herein, transmitting or receiving the waveform within the slot further may include operations, features, means, or instructions for receiving the waveform within the slot and for decoding the waveform based on identifying that the slot includes the defined number of symbol periods, or the defined number of symbol period and the at least one additional symbol period.

In some examples of the method, apparatuses, and non-transitory computer-readable medium described herein, transmitting or receiving the waveform within the slot further may include operations, features, means, or instructions for generating the waveform based on identifying that the slot includes the defined number of symbol periods, or the defined number of symbol period and the at least one additional symbol period, and for transmitting the waveform within the slot.

In some examples of the method, apparatuses, and non-transitory computer-readable medium described herein, the waveform may include a reference signal within the at least one additional symbol period.

In some examples of the method, apparatuses, and non-transitory computer-readable medium described herein, the waveform may include a data transmission within the at least one additional symbol period.

In some examples of the method, apparatuses, and non-transitory computer-readable medium described herein, the at least one additional symbol period may occur after a last symbol period of the defined number of symbol periods within the slot.

In some examples of the method, apparatuses, and non-transitory computer-readable medium described herein, the at least one additional symbol period may occur before a beginning symbol period of the defined number of symbol periods within the slot.

In some examples of the method, apparatuses, and non-transitory computer-readable medium described herein, the waveform may be a DFT-S-OFDM waveform or a CP-OFDM waveform.

In some examples of the method, apparatuses, and non-transitory computer-readable medium described herein, the control information indicating the resource allocation may include a time domain resource allocation for the transmitting or receiving, where the method, apparatuses, and non-transitory computer-readable medium described herein may further include operations, features, means, or instructions for interpreting the time domain resource allocation in the control information based on whether the slot is identified as including the defined number of symbol periods, or the defined number of symbol periods and at least one additional symbol period.

A method of wireless communications by a base station is described. The method may include identifying an operating mode of a UE, identifying allowed resource allocation sizes for transmitting or receiving a waveform based on the operating mode, and transmitting or receiving a waveform to the UE based on the allowed resource allocation sizes.

An apparatus for wireless communications by a base station is described. The apparatus may include a processor, memory in electronic communication with the processor, and instructions stored in the memory. The instructions may be executable by the processor to cause the apparatus to identify an operating mode of a UE, to identify allowed resource allocation sizes for transmitting or receiving a waveform based on the operating mode, and to transmit or receive a waveform to the UE based on the allowed resource allocation sizes.

Another apparatus for wireless communications by a base station is described. The apparatus may include means for identifying an operating mode of a UE, means for identifying allowed resource allocation sizes for transmitting or receiving a waveform based on the operating mode, and means for transmitting or receiving a waveform to the UE based on the allowed resource allocation sizes.

A non-transitory computer-readable medium storing code for wireless communications by a base station is described. The code may include instructions executable by a processor to identify an operating mode of a UE, to identify allowed resource allocation sizes for transmitting or receiving a waveform based on the operating mode, and to transmit or receive a waveform to the UE based on the allowed resource allocation sizes.

In some examples of the method, apparatuses, and non-transitory computer-readable medium described herein, the UE operating mode may further include a first transmitting or receiving mode or a second transmitting or receiving mode, where the two transmitting or receiving modes correspond to different algorithms to transmit or receive a same waveform.

In some examples of the method, apparatuses, and non-transitory computer-readable medium described herein, a first set of allowed resource allocation sizes may be supported for the first transmitting or receiving mode, and a second set of allowed resource allocation sizes may be supported for the second transmitting or receiving mode.

In some examples of the method, apparatuses, and non-transitory computer-readable medium described herein, the second set of allowed resource allocation sizes may be a subset of the first set of allowed resource allocation sizes.

In some examples of the method, apparatuses, and non-transitory computer-readable medium described herein, the second set of allowed resource allocation sizes may be different than the first set of allowed resource allocation sizes.

In some examples of the method, apparatuses, and non-transitory computer-readable medium described herein, the UE operating mode may be a time domain mode or a DFT-S-OFDM mode, and the waveform may be a DFT-S-OFDM waveform.

DETAILED DESCRIPTION

Figure 1:
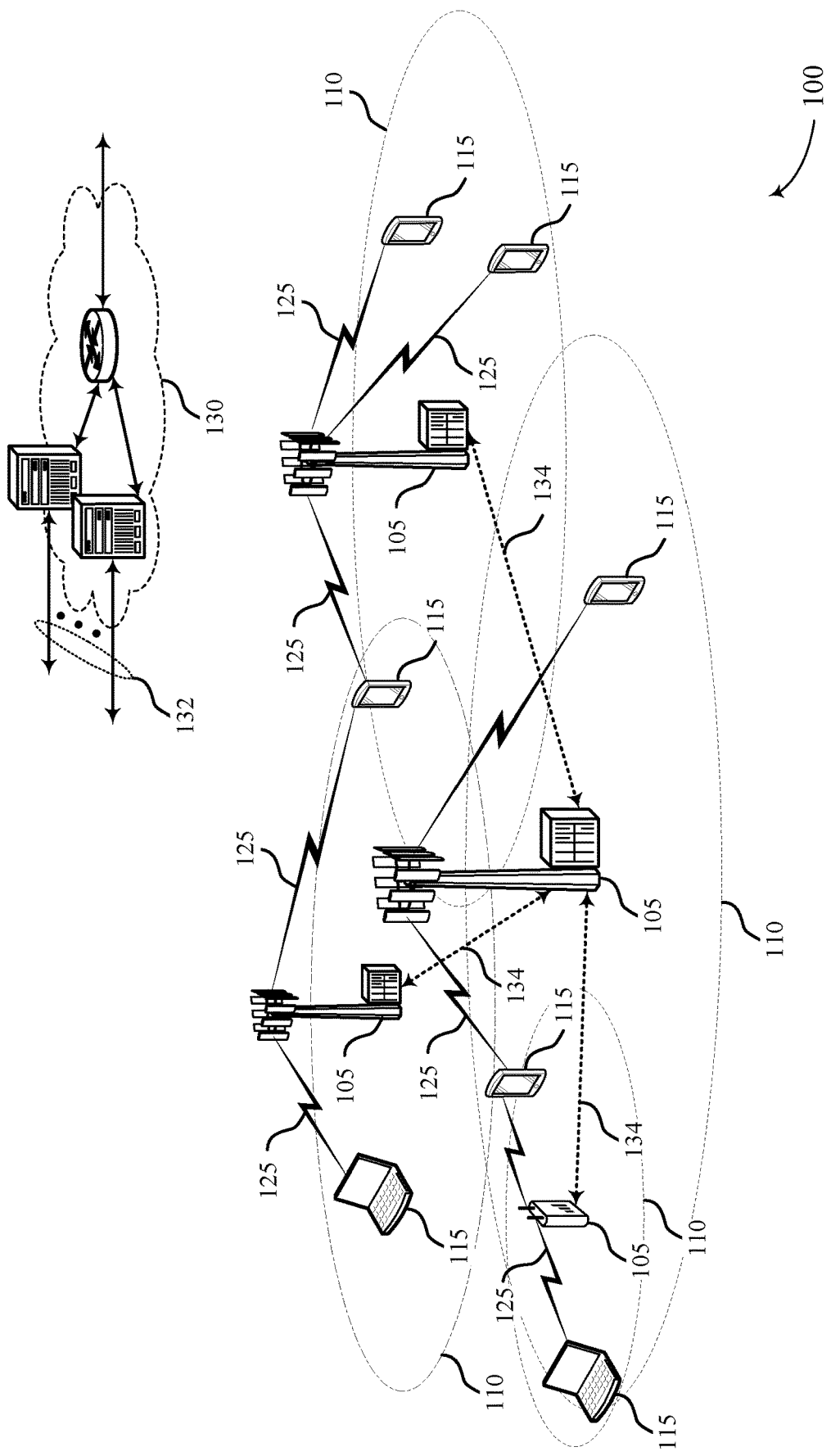
FIG. 1 illustrates an example of a system for wireless communications that supports waveform generation in millimeter wave (mmW) band with time domain implementation in accordance with aspects of the present disclosure.

Generally, the described techniques support generating or decoding a waveform for communications between a user equipment (UE) and a base station based on a resource allocation of a slot for the communications. As described herein, the generated or decoded waveform may include a discrete Fourier transform spread orthogonal frequency division multiplexing (DFT-S-OFDM) waveform or a cyclic prefix orthogonal frequency domain multiplexing (CP-OFDM) waveform. In some cases, the UE may receive control information from the base station that indicates the resource allocation for the slot, and the UE and base station may identify that the slot contains a defined number of symbol periods (e.g., 14 symbol periods) or that the slot contains the defined number of symbol periods and at least one additional symbol period (e.g., a partial symbol period, one full symbol period, multiple symbol periods, etc.), where the waveform is then generated (e.g., transmitted) or decoded (e.g., received) based on the number of symbol periods in the slot. Additionally, the UE and base station may identify the number of symbol periods in the slot based on a location of the slot within a defined number of slots configured for the communications (e.g., a cyclic time interval). For example, a first slot of the defined number of slots may include the defined number of symbol periods with the at least one additional symbol period, and the rest of the slots in the defined number of slots may include the defined number of symbol periods (e.g., without the at least one additional symbol period).

Additionally or alternatively, the UE and base station may identify an operating mode of the UE, identify allowed resource allocation sizes for generating or decoding the waveform, and generate or decode the waveform based on the allowed resource allocation sizes. For example, different sets of resource allocations (e.g., of different sizes) may be used for the UE with different implementations (e.g., operating modes, such as time domain based implementations or DFT-S based implementations) of transmitters and receivers with a same waveform (e.g., a DFT-S-OFDM waveform). In some cases, the operating mode may include one or more transmitting or receiving modes that correspond to different algorithms for transmitting or receiving the same waveform. In some examples, aspects of the present disclosure may provide a DFT-S implementation for high mmW band operation with a time domain implementation. Additionally, the one or more transmitting or receiving modes may be supported by separate sets of allowed resource allocation sizes, where the separate sets of allowed resource allocation sizes may be subsets of each other or be different than each other.

Aspects of the disclosure are initially described in the context of a wireless communications system. Additional aspects of the present disclosure are illustrated by an additional wireless communications system, a waveform generation process, and process flow examples. Aspects of the disclosure are further illustrated by and described with reference to apparatus diagrams, system diagrams, and flowcharts that relate to waveform generation in mmW band with time domain implementation.

FIG. 1 illustrates an example of a wireless communications system 100 that supports waveform generation in mmW band with time domain implementation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems (e.g., for a high frequency range, such as a frequency range 4 (FR4) or frequency band that includes frequencies greater than 52.6 GHz), a UE 115 and a base station 105 may communicate via signal waveforms transmitted over a carrier made up of multiple subcarriers as described above for both uplink and downlink transmissions. For example, the signal waveforms may be formed based on different OFDM techniques, such as DFT-S-OFDM and CP-OFDM. The UE 115 and base station 105 may use DFT-S-OFDM waveforms to achieve a low peak to average power ratio (PAPR) and possible time domain low complexity implementations of a transmitter and receiver (e.g., at both wireless devices). Additionally or alternatively, the UE 115 and base station 105 may use CP-OFDM waveforms for high spectrum efficiency and MIMO communications. The OFDM techniques may allow the UE 115 and base station 105 to multiplex traffic by allocating specific patterns of subcarriers in the time-frequency space to different users (e.g., UEs 115). Each of the subcarriers may be separated by an SCS value, where individual waveforms for each subcarrier is separated by the SCS value within the entire multiplexed waveform.

In particular, DFT-S-OFDM may include multiplexing transmissions in specific frequency allocation blocks within an overall system bandwidth according to scheduler instructions from the base station 105. For example, the DFT-S-OFDM may include taking a number of samples within an OFDM symbol and converting the number of samples into a different number (e.g., a prime number) via a discrete Fourier transform (DFT) operation. Additionally or alternatively, the CP-OFDM may include cyclic prefixes (CPs) of a duplication of a fraction of an end of symbol that also occurs at the beginning of the symbol.

For downlink communications between a base station 105 and a UE 115, an antenna array may be large (e.g., at both wireless devices), resulting in a large antenna gain. Additionally, the downlink communications may occur according to different limitations and regulations (e.g., effective isotropic radiated power (EIRP) limitations) that limit the allowable PAPR conditions. OFDM techniques may generally be associated with high PAPR values, where CPs are utilized to reduce the PAPR of OFDM transmissions. However, based on the different limitations and regulations, the need to reduce PAPR (e.g., to achieve low PAPR values) may not be as strong based on the limitations already lowering the PAPR values. In some cases, DFT-S-OFDM waveforms may be used for reducing complexities at a receiving side of the waveform transmissions (e.g., from a receiver complexity perspective). The DFT-S-OFDM waveform may include resampling and upconverting a time domain waveform. When a channel does not have one or more multipath components (e.g., a line of sight (LOS) channel), a time domain waveform (e.g., time domain equalizer) may be sufficient for the downlink communications. Additionally or alternatively, if the channel does include the one or more multipath components, a receiver complexity and performance tradeoff may still occur. In some cases, if PAPR is not a concern, the downlink communications may include multiplexing (e.g., via FDM) CP-OFDM and DFT-S-OFDM waveforms for different UEs 115, where a DFT precoder may be applied to one or more resource elements (REs).

For uplink communications between the UE 115 and the base station 105, similar limitations and regulations may be present (e.g., EIRP limitations). However, antenna arrays for transmitting (and receiving) the uplink communications may be smaller (e.g., compared to the downlink communications), resulting in an antenna gain not being as large (e.g., as with the downlink communications). Additionally, PAPR benefits of DFT-S-OFDM waveforms may be useful for the uplink communications. In some cases, the uplink communications may also include low complexity transmitters. However, as a note, DFT-S-OFDM waveforms may include fast Fourier transforms (FFTs) and inverse FFTs (IFFTs), which may lead the DFT-S-OFDM waveforms to be more complex than CP-OFDM waveforms. Additionally or alternatively, the base station 105 may be able to afford higher complexities and may support an FFT/IFFT based receiver.

As described herein, a DFT-S-OFDM waveform may be used that can support a time domain implementation for both a transmitter and receiver side (e.g., with a possible performance tradeoff). This DFT-S-OFDM waveform may be supported via a CP-DFT-S-OFDM waveform, a pre-DFT guard interval (GI) DFT-S-OFDM (PreDFT-GI-DFT-S-OFDM) waveform, or a combination thereof, where the CP-DFT-S-OFDM waveform is further described herein. In some cases, a DFT-S-OFDM waveform may include up-sampling a time domain waveform with a sync filter. For the time domain implementation, the DFT-S-OFDM waveform may use the up-sampling and a pulse shaping filter. Based on the pulse shaping filter, for a same signal sample rate, an occupied bandwidth for the DFT-S-OFDM waveform may be wider, but the PAPR of the waveform may be better (e.g., than a conventional OFDM waveform transmission).

In some cases, conventional (e.g., legacy) DFT-S-OFDM waveforms may include restrictions on allocation sizes (e.g., allowed resource allocation sizes), where the restrictions are in the unit of $2^i 3^j 5^k$ RBs (e.g., the allocation sizes have to be a prime number of RBs). This restriction may support low complexity DFT implementations (e.g., at transmitter and receiver sides). As described herein, the DFT-S-OFDM waveform described above for supporting the time domain implementations may also follow these allocation size restrictions. However, additional restrictions may be considered for supporting the time domain implementations.

For CP-OFDM waveforms and CP-DFT-S-OFDM waveforms, a CP length may vary based on an SCS for the waveform. For example, based on a 15 kHz SCS, for each slot, a first symbol (e.g., symbol 0) and an eighth symbol (e.g., symbol 7) may have a CP length of 160*k samples relative to an OFDM symbol length of 2048*k samples. Based on a 30 kHz SCS, for each slot, a first symbol (e.g., symbol 0) may have a CP length of 176*k samples relative to an OFDM symbol length of 2048*k samples. Based on a 60 kHz SCS, for every two (2) slots, a first symbol (e.g., symbol 0) of a first slot of the two (2) slots may have a CP length of 208*k samples relative to an OFDM symbol length of 2048*k samples. Based on a 120 kHz SCS, for every four (4) slots, a first symbol (e.g., symbol 0) of a first slot of the four (4) slots may have a CP length of 272*k samples relative to an OFDM symbol length of 2048*k samples. Based on a 240 kHz SCS, for every eight (8) slots, a first symbol (e.g., symbol 0) of a first slot of the eight (8) slots may have a CP length of 400*k samples relative to an OFDM symbol length of 2048*k samples. In some cases, for every other symbol not specified above in the different slots addressed, a same CP length may be used (e.g., 144*k samples). The scaling design for defining the CP length based on the SCS of the waveform may entail splitting the 2048*k samples of the OFDM symbol length to 14 symbols (e.g., –a conventional number of symbols in a slot for some wireless communications systems), where the samples are non-uniform across the 14 symbols.

However, at higher frequencies (e.g., a frequency range 2 (FR2) or FR4), higher SCSs may be used for waveform transmissions. For example, 960 kHz and 1920 kHz SCSs may be used to cover wide bandwidths at the higher frequencies. If the design for defining the CP length as described above is applied to these higher SCSs, imbalances may arise. For example, based on the 960 kHz SCS, for every 32 slots, a first symbol (e.g., symbol 0) of a first slot of the 32 slots may have a CP length of 1168*k samples relative to an OFDM symbol length of 2048*k samples. Additionally, based on the 1920 kHz SCS, for every 64 slots, a first symbol (e.g., symbol 0) of a first slot of the 64 slots may have a CP length of 2192*k samples relative to an OFDM symbol length of 2048*k samples. Similar to above, for every other symbol not specified above in the different slots addressed, a same CP length may be used (e.g., 144*k samples). As can be seen, with increasing SCSs, imbalances of CP lengths may increase. In particular, for the 1920 kHz SCS, the CP length of 2192*k samples may be greater than the OFDM symbol length of 2048*k samples. Accordingly, a waveform (e.g., a DFT-S-OFDM waveform, a CP-OFDM waveform, a CP-DFT-S-OFDM waveform, etc.) may be generated and transmitted incorrectly based on a CP length exceeding the length of the symbol.

Wireless communications system 100 may support efficient techniques for generating (or decoding) a waveform transmission regardless of an SCS. For example, for the 1920 kHz SCS as described above, an additional symbol period for the first slot may be defined and used for a corresponding waveform transmission. That is, for the 1920 kHz SCS, the first slot of the 64 slots may include 15 OFDM symbols (e.g., symbol periods). Accordingly, this design may involve a different number of OFDM symbols per slot, where a first slot out of every 64 slots may include 15 symbols per slot and the other 63 slots of the 64 slots may include 14 symbols. Additionally, for SCSs higher than 1920 kHz, a first slot out of N slots may potentially accommodate more symbols than the rest of the N slots. A UE 115 or a base station 105 may then generate and decode a waveform transmission for a slot based on the number of symbols in the slot. If the slot includes 15 symbols, the extra symbol may occur at the beginning of the slot or at the end of the slot. In some cases, the extra symbol may include a reference signal or a data transmission for the waveform. Additionally or alternatively, the UE 115 and base station 105 may identify an operating mode of the UE 115, identify allowed resource allocation sizes for generating or decoding the waveform, and generate or decode the waveform based on the allowed resource allocation sizes.

Figure 2:
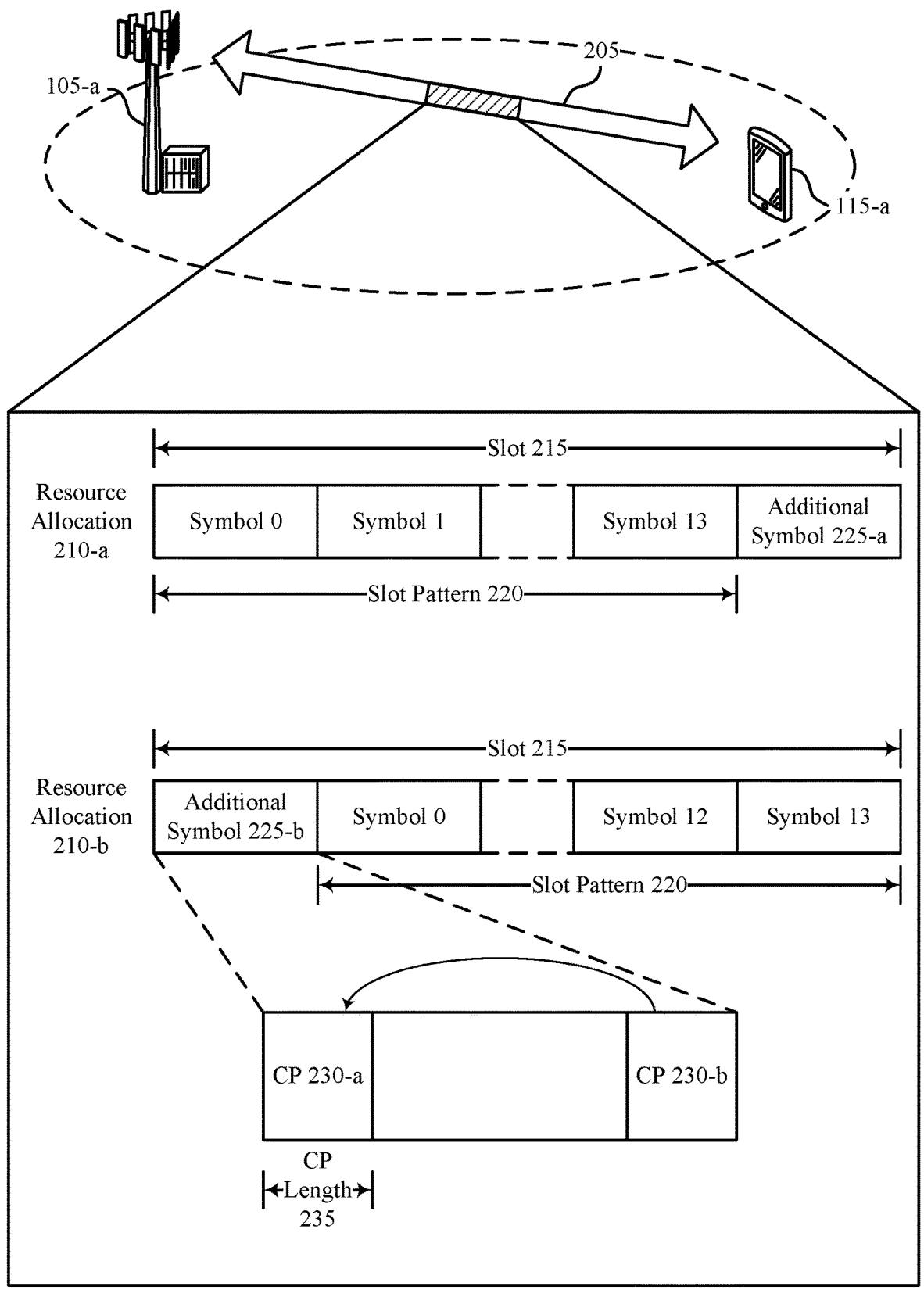
FIG. 2 illustrates an example of a wireless communications system that supports waveform generation in mmW band with time domain implementation in accordance with aspects of the present disclosure.

FIG. 2 illustrates an example of a wireless communications system 200 that supports waveform generation in mmW band with time domain implementation in accordance with aspects of the present disclosure. In some examples, wireless communications system 200 may implement aspects of wireless communications system 100. Wireless communications system 200 may include a base station 105-a and a UE 115-a, which may be examples of base stations 105 and UEs 115, respectively, as described with reference to FIG. 1. As described herein, base station 105-a and UE 115-a may communicate on a channel 205 (e.g. carrier) via signal waveforms (e.g., DFT-S-OFDM waveforms, CP-OFDM waveforms, CP-DFT-S-OFDM waveforms, quadrature amplitude modulation (QAM) waveforms, etc.).

In some cases, the signal waveforms may be generated and decoded based on a resource allocation 210 indicated for a corresponding slot 215 for the communications between base station 105-a and UE 115-a on channel 205. The resource allocations 210 may allow for a different number of symbols (e.g., a variable number of slots) of one slot out of every N slots. For example, the slot 215 may include a slot pattern 220 that includes a defined number of symbols (e.g., symbol periods) and an additional symbol 225 (e.g., an extra symbol). In some cases, the slot pattern 220 may be a conventional allocation of symbols for a slot and include 14 symbols (e.g., OFDM symbols) that number from zero (0) to 13 (i.e., the first symbol is symbol 0 and the last symbol is symbol 13).

As shown, different resource allocations 210 may include different locations of the additional symbol 225. For example, a first resource allocation 210-a may include an additional symbol 225-a that is located at the end of the slot 215, after the slot pattern 220 is finished (e.g., after symbol 13). Additionally or alternatively, a second resource allocation 210-b may include an additional symbol 225-b that is located at the beginning of the slot 215, before the slot pattern 220 begins (e.g., prior to symbol 0). To reduce an implementation impact, the additional symbol 225 may be appended towards the end of the slot 215 (as shown in resource allocation 210-a) instead of at the beginning of the slot 215 (e.g., prior to symbol 0). By appending the additional symbol 225 towards the end of the slot 215, a transport block size (TBS) determination for the slot 215 may not need to account for the additional symbol 225.

In some cases, the additional symbol 225 may be used for transmitting additional reference signals (e.g., demodulation reference signals (DMRSs), channel state information reference signals (CSI-RSs), tracking reference signals (TRSs), etc.) to enhance reference signal processing at a receiver side. Additionally or alternatively, the additional symbol 225 may be used for an additional data transmission that can increase the throughput for the waveform, reduce the code rate of the waveform, or a combination thereof. Base station 105-a may transmit control information to UE 115-a that includes configuration information about the resource allocation 210 (e.g., with the location of the additional symbol 225), what the additional symbol 225 is being used for, or additional information for generating or decoding subsequent waveforms. In some cases, the control information may include time domain resource allocation for the waveform, and UE 115-a or base station 105-a may interpret the time domain resource allocation based on the resource allocation 210 (e.g., if the slot 215 includes the additional symbol 225 or not).

The additional symbol 225 may include a full length symbol (e.g., length of 2048*k samples), a partial symbol length (e.g., a half symbol), multiple symbols, or a longer symbol length. In some cases, higher SCSs may be used for the additional symbol 225 in comparison to an SCS for the symbols in the slot pattern 220. For example, with a 960 kHz SCS, base station 105-a or UE 115-a may use an increased SCS to harvest the additional symbol 225 (e.g., a partial symbol).

In some implementations, each symbol of the slot 215 (e.g., each symbol in the slot pattern 220 and the additional symbol 225) may include a CP 230. As described above, the CP 230 may include a duplication of a fraction of an end of symbol that also occurs at the beginning of the symbol. For example, as shown as an example for additional symbol 225-b, CP 230-b may be a fraction of the end of additional symbol 225-b that also occurs as CP 230-a at the beginning of additional symbol 225-b. While shown for additional symbol 225-b, the CP 230 may occur similarly for the other symbols of the slot 215. Accordingly, each CP 230 of each symbol in slot 215 may include a same CP length 235. For example, CP length 235 may be equal to 144*k samples.

Additionally or alternatively, a resource allocation 210 may maintain the slot pattern 220 of 14 symbols per slot without adding the additional symbol 225. Accordingly, an approximately equal CP may be used for each symbol of the slot 215. For example, a scaling design for determining a CP length based on an SCS for the waveform as described above with reference to FIG. 1 may be used to determine the CP lengths for each symbol. Additionally, the scaling design may also be used for higher SCS values. For example, based on a 480 kHz SCS, for each slot (e.g., slot 215), a first symbol (e.g., symbol 0) and an eighth symbol (e.g., symbol 7) may have a CP length of 160*k samples relative to an OFDM symbol length of 2048*k samples. Based on a 960 kHz SCS, for each slot, a first symbol (e.g., symbol 0) may have a CP length of 176*k samples relative to an OFDM symbol length of 2048*k samples. Based on a 1920 kHz SCS, for every two (2) slots, a first symbol (e.g., symbol 0) of a first slot of the two (2) slots may have a CP length of 208*k samples relative to an OFDM symbol length of 2048*k samples. For every other symbol not specified above in the different slots addressed, a same CP length may be used (e.g., 144*k samples).

In some cases, a restriction may be placed on the size (e.g., bandwidth) of the resource allocation 210. For a single carrier implementation of a transmitter, K samples may be oversampled to K/R samples for the waveform (e.g., DFT-S-OFDM waveform, CP-OFDM waveform, CP-DFT-S-OFDM waveform, etc.). Additionally, CPs may then be formed by L of the K/R samples. Accordingly, L and K/R may be proportional to a nominal CP length and a nominal OFDM symbol length (e.g., 144*k samples and 2048*k samples, respectively). If the CP length is 144*k samples, 144:2048=9:128, which may indicate that K/R=128*X and the CP length is 9*X for an integer X. Additionally or alternatively, if the CP length is 160*k samples, 160:2048=10:128, which may indicate that K/R=128*X and the CP length is 10*X for an integer X.

As a note, the nominal length of a CP may be 144*k samples, and the other CP lengths are multiples of 16*k samples added to the 144*k samples. Accordingly, for any waveform (e.g., waveform design), K/R=128*X and K=128*X*R. Typically, R=½ for a typical pulse shaping filter (e.g., a cx2 filter), which leads to K=64*X (i.e., the resource allocation 210 may be in the unit of 64 REs). However, 64 REs may not be an integer number of RBs, and K may need to be in the form of $2^i 3^j 5^k$ RBs. To further restrict to a full RB allocation for the resource allocation 210, K=16*Y, where $Y=2^i 3^j 5^k$. Table 1 below shows possible bandwidths (e.g., resource allocation restrictions in MHz) for the resource allocation 210 at 960 kHz SCS and 1920 kHz SCS for the different Y and K values.

TABLE 1

Full RB Allocation Bandwidths

| Y | # of RBs | MHz at 960 kHz SCS | MHz at 1920 kHz SCS |
|---|---|---|---|
| 1 | 16 | 184.32 | 368.64 |
| 2 | 32 | 368.64 | 737.28 |
| 3 | 48 | 552.96 | 1105.92 |
| 4 | 64 | 737.28 | 1474.56 |
| 5 | 80 | 921.60 | 1843.20 |
| 6 | 96 | 1105.92 | N/A |
| 8 | 128 | 1474.56 | N/A |
| 9 | 144 | 1658.88 | N/A |
| 10 | 160 | 1843.20 | N/A |

Additionally or alternatively, rather than restricting the resource allocation 210 to full RB allocations, 64 REs may be used as an allocation unit. For example, based on the 64 REs allocation unit, K=16*X, where $X=2^i 3^j 5^k$. In some cases, the 64 REs allocation unit may provide more values for possible bandwidths for the resource allocation 210. Table 2 below shows the possible bandwidth for the resource allocation 210 at 960 kHz SCS and 1920 kHz SCS for the different X and K values. In some cases, to achieve a 70% occupied channel bandwidth (OCB) for a 540 MHz, 1080 MHz, or 2160 MHz total bandwidth, a bandwidth of 378 MHz, 756 MHz, or 1512 MHz, respectively, may be needed.

TABLE 2

RE Based Allocation Bandwidths

| X | # of RBs | MHz at 960 kHz SCS | MHz at 1920 kHz SCS |
|---|---|---|---|
| 1 | 5⅓ | 61.44 | 122.88 |
| 2 | 10⅔ | 122.88 | 245.76 |
| 3 | 16 | 184.32 | 368.64 |
| 4 | 21⅓ | 245.76 | 491.52 |
| 5 | 26⅔ | 307.20 | 614.40 |
| 6 | 32 | 368.64 | 737.28 |
| 8 | 42⅔ | 491.52 | 983.04 |
| 9 | 48 | 552.96 | 1105.92 |
| 10 | 53⅓ | 614.40 | 1228.80 |
| 12 | 64 | 737.28 | 1474.56 |
| 15 | 80 | 921.60 | 1843.20 |
| 16 | 85⅓ | 983.04 | 1966.08 |
| 18 | 96 | 1105.92 | N/A |
| 20 | 106⅔ | 1228.80 | N/A |
| 24 | 128 | 1474.56 | N/A |
| 25 | 133⅓ | 1536.00 | N/A |
| 27 | 144 | 1658.88 | N/A |
| 30 | 160 | 1843.20 | N/A |
| 32 | 170⅔ | 1966.08 | N/A |

In some implementations, UE 115-a and base station 105-a may identify an operating mode of UE 115-a, identify allowed resource allocation sizes for generating or decoding the waveform based on the operating mode of UE 115-a, and generate or decode the waveform based on the allowed resource allocation sizes. For example, different sets of resource allocations (e.g., of different sizes) may be used for the waveforms for different implementations (e.g., operating modes, such as time domain based implementations or DFT-S-OFDM based implementations) of transmitters and receivers with a same waveform (e.g., a DFT-S-OFDM waveform). For a time domain based implementation, the allowed resource allocation sizes may be based on $2^i 3^j 5^k$ RBs. Additionally or alternatively, for DFT-S-OFDM based implementations, the allowed resource allocation sizes may be based on the values included in Tables 1 or 2.

In some cases, the operating mode may include one or more transmitting or receiving modes that correspond to different algorithms for transmitting or receiving the same waveform. Additionally, the one or more transmitting or receiving modes may be supported by separate sets of allowed resource allocation sizes, where the separate sets of allowed resource allocation sizes may be subsets of each other or be different than each other.

Figure 3:
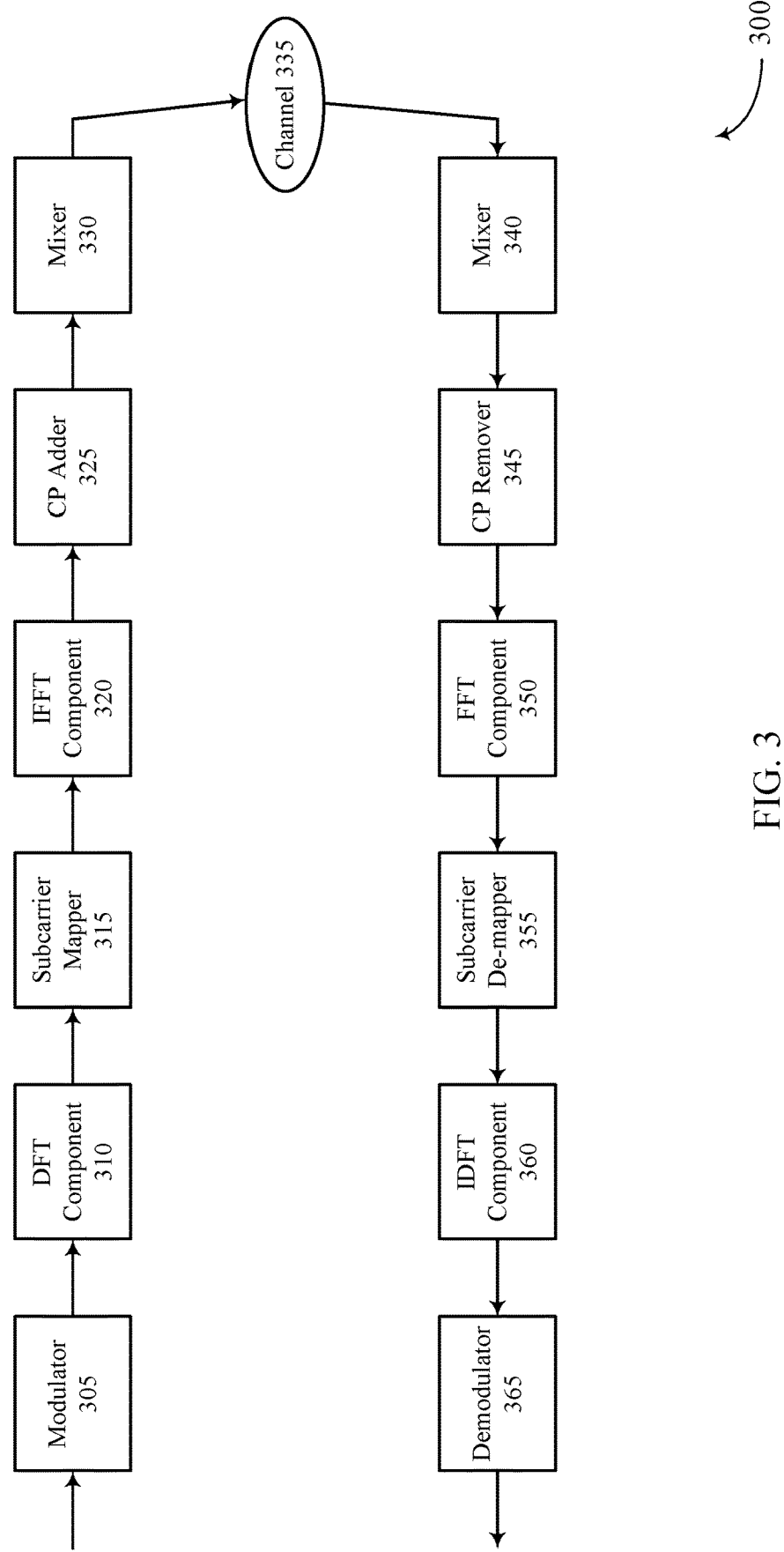
FIG. 3 illustrates an example of a waveform generation process that supports waveform generation in mmW band with time domain implementation in accordance with aspects of the present disclosure.

FIG. 3 illustrates an example of a waveform generation process 300 that supports waveform generation in mmW band with time domain implementation in accordance with aspects of the present disclosure. In some examples, waveform generation process 300 may implement aspects of wireless communications systems 100 and/or 200. As described herein, a UE 115 and a base station 105 may communicate via waveform transmissions, where the waveforms are based on DFT-S-OFDM waveforms, CP-OFDM waveforms, CP-DFT-S-OFDM waveforms, etc. The waveform generation process 300 may illustrate how a transmitter transforms a number of information bits and generates a waveform from the transformed bits, as well as how a receiver receives the waveform and decodes the waveform to receive the information bits. In this example, either the UE 115 or the base station 105 may be the transmitter, and the other, as well as other devices, may be the receiver.

The transmitter may first take the information bits and pass them through a modulator 305. This modulation may include encoding a sequence of bits (e.g., the information bits) onto a carrier signal by adjusting parameters that describe the signal. The encoded sequence of bits may then pass to a DFT component 310, which transforms the encoded bits based on Fourier transforms. In some cases, the DFT component 310 may include DFT spreading that provides low PAPR (e.g., via a SC-FDMA waveform). A subcarrier mapper 315 may then map the bits to different subcarriers of the carrier signal. In some cases, the base station 105 may include a scheduler that assigns unique time-frequency slot(s) for different terminals, which may provide intra-cell orthogonality. Accordingly, the intra-cell orthogonality may provide adaptive bandwidth transmissions.

After being mapped, the bits may then pass through an IFFT component 320 (e.g., an IFFT operation) that computes in-phase and quadrature components of the corresponding time-domain waveform and places the components in a correct order via a parallel-to-serial converter. Then, a CP adder 325 may occur, where a CP is added to symbols of the waveform. In some cases, the CP may be inserted to combat multipath and to ease receiver equalization plus provide inter-user orthogonality (e.g., when multiple waveforms from multiple users are transmitted concurrently. A mixer 330 may then then mix the waveform from baseband to a desired radio frequency band (e.g., a mmW band) for transmission via a wireless channel 335. The receiver may then use a mixer 340 on the received waveform to mix down to baseband for processing, and a CP remover 345 may discard the CP from the received waveform prior to performing FFT processing by an FFT component 350. The FFT component 350 may then perform an FFT on the waveform that is an inverse process of the IFFT component 320 on the transmitter side to produce the time-domain waveform. The subcarrier de-mapper 355 may then take the subcarriers in the waveform and derive the bits from the mapping. An inverse DFT (IDFT) component 360 may perform an IDFT process, and the demodulator 365 may output decoded bits, enabling the receiver to receive the information bits originally transmitted by the transmitter.

Figure 4:
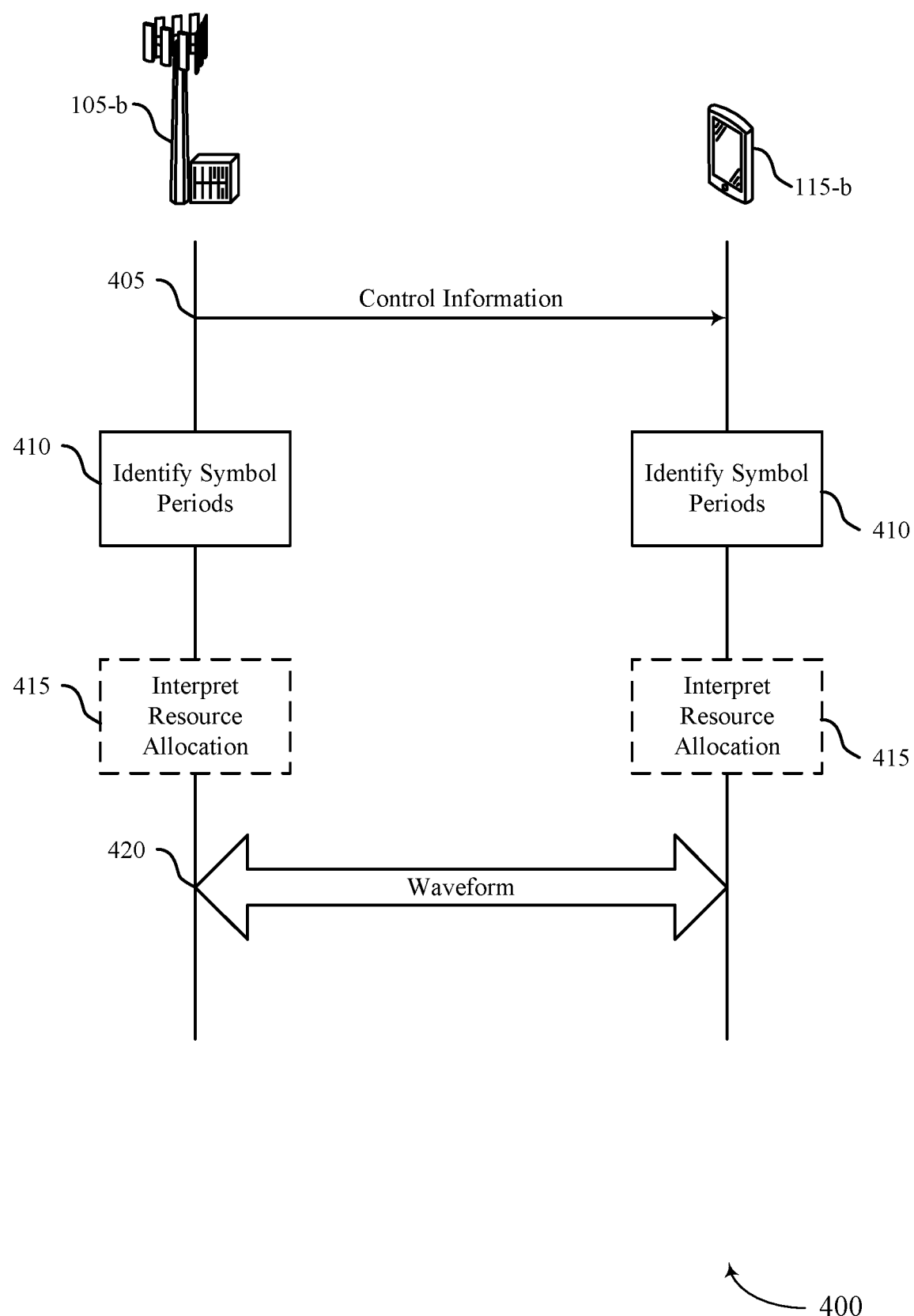
FIGS. 4 and 5 illustrate examples of process flows that support waveform generation in mmW band with time domain implementation in accordance with aspects of the present disclosure.

FIG. 4 illustrates an example of a process flow 400 that supports waveform generation in mmW band with time domain implementation in accordance with aspects of the present disclosure. In some examples, process flow 400 may implement aspects of wireless communications systems 100 and/or 200. Process flow 400 may include a base station 105-b and a UE 115-b, which may be examples of base stations 105 and UEs 115, respectively, as described with reference to FIGS. 1-3.

In the following description of the process flow 400, the operations between base station 105-b and UE 115-b may be performed in different orders or at different times. Certain operations may also be left out of the process flow 400, or other operations may be added to the process flow 400. While base station 105-b and UE 115-b are shown performing the operations of process flow 400, any wireless device may perform the operations shown.

At 405, UE 115-b may receive, from base station 105-b, control information indicating a resource allocation within a slot. In some cases, the control information indicating the resource allocation may include a time domain resource allocation for transmitting or receiving a waveform.

At 410, UE 115-b, base station 105-b, or both may identify that the slot includes a defined number of symbol periods (e.g., 14 symbols) or the defined number of symbol periods and at least one additional symbol period based on a position of the slot within a cyclic time interval that includes a defined number of slots. For example, if the position of the slot is at a certain position (e.g., a first occurring slot) within a within a cyclic time interval (e.g., a particular slot that occurs once every 64 slots), the slot may include the defined number of symbol periods and the at least one additional symbol period (e.g., includes 15 symbol periods, rather than 14 symbol periods). Additionally or alternatively, any other slots of the defined number of slots (e.g., other than the first slot), the other slots may include the defined number of symbol periods. In some cases, the at least one additional symbol period may occur after a last symbol period of the defined number of symbol periods within the slot. Additionally or alternatively, the at least one additional symbol period may occur before a beginning symbol period of the defined number of symbol periods within the slot.

At 415, UE 115-b, base station 105-b, or both may interpret the time domain resource allocation in the control information based on whether the slot is identified as including the defined number of symbol periods or the defined number of symbol periods and the at least one additional symbol period (e.g., interpret the slot as including either 14 or 15 symbol periods based on where the slot is within the cyclic time interval).

At 420, UE 115-b, base station 105-b, or both may transmit or receive a waveform within the slot. In some cases, a first SCS may be used for the transmitting or receiving of each symbol period within the defined number of symbol periods, and a second SCS may be used for the transmitting or receiving of the at least one additional symbol period, where the first SCS and the second SCS are the same or different. Additionally, transmitting or receiving the waveform may include receiving the waveform within the slot and decoding the waveform based on the identifying that the slot includes the defined number of symbol periods or includes the defined number of symbol periods and the at least one additional symbol period. Additionally or alternatively, transmitting or receiving the waveform may include generating the waveform based on the identifying that the slot includes the defined number of symbol periods or includes the defined number of symbol period and the at least one additional symbol period and transmitting the waveform within the slot. In some cases, the waveform may include a reference signal within the at least one additional symbol period, a data transmission within the at least one additional symbol period, or a combination thereof. Additionally, the waveform may be a DFT-S-OFDM waveform or a CP-OFDM waveform.

Figure 5:
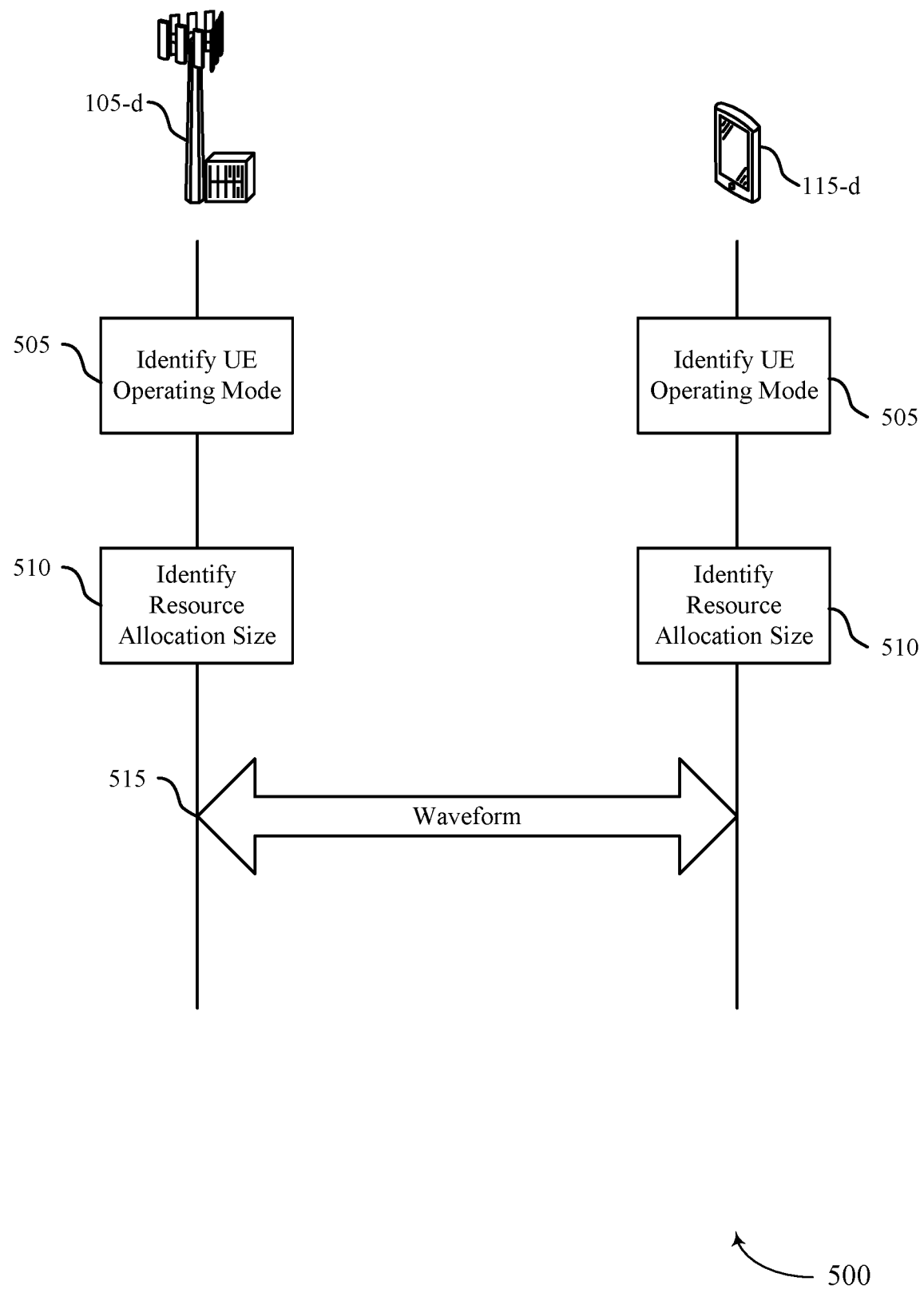

FIG. 5 illustrates an example of a process flow 500 that supports waveform generation in mmW band with time domain implementation in accordance with aspects of the present disclosure. In some examples, process flow 500 may implement aspects of wireless communications systems 100 and/or 200. Process flow 500 may include a base station 105-c and a UE 115-c, which may be examples of base stations 105 and UEs 115, respectively, as described with reference to FIGS. 1-4.

In the following description of the process flow 500, the operations between base station 105-c and UE 115-c may be performed in different orders or at different times. Certain operations may also be left out of the process flow 500, or other operations may be added to the process flow 500. While base station 105-c and UE 115-c are shown performing the operations of process flow 500, any wireless device may perform the operations shown.

At 505, UE 115-c, base station 105-c, or both may identify an operating mode of UE 115-d. In some cases, the operating mode of UE 115-c may include a first transmitting or receiving mode or a second transmitting or receiving mode, where the two transmitting or receiving modes correspond to different algorithms to transmit or receive a same waveform. Accordingly, a first set of allowed resource allocation sizes may be supported for the first transmitting or receiving mode (e.g., see Table 1 for full RB allocation bandwidths), and a second set of allowed resource allocation sizes may be supported for the second transmitting or receiving mode (e.g., see Table 2 for RE based allocation bandwidths). In some cases, the second set of allowed resource allocation sizes may be a subset of the first set of allowed resource allocation sizes. Additionally or alternatively, the second set of allowed resource allocation sizes may be different than the first set of allowed resource allocation sizes.

At 510, UE 115-c, base station 105-c, or both may identify allowed resource allocation sizes for transmitting or receiving a waveform based on the operating mode (e.g., a particular row in Table 1 or 2). In some cases, the operating mode of UE 115-c may be a time domain mode or a DFT-S-OFDM mode, and the waveform may be a DFT-S-OFDM waveform. In some examples, base station 105-c may signal or otherwise configure the UE with the allowed resource allocation sizes (e.g., downlink control information (DCI) signaling, RRC signaling, transmit control information, transmit an indication of a table and/or table entries, etc.)

At 515, UE 115-c, base station 105-c, or both may transmit or receive a waveform (e.g., to or from the other wireless device or a separate wireless device) based on the allowed resource allocation sizes.

Figure 6:
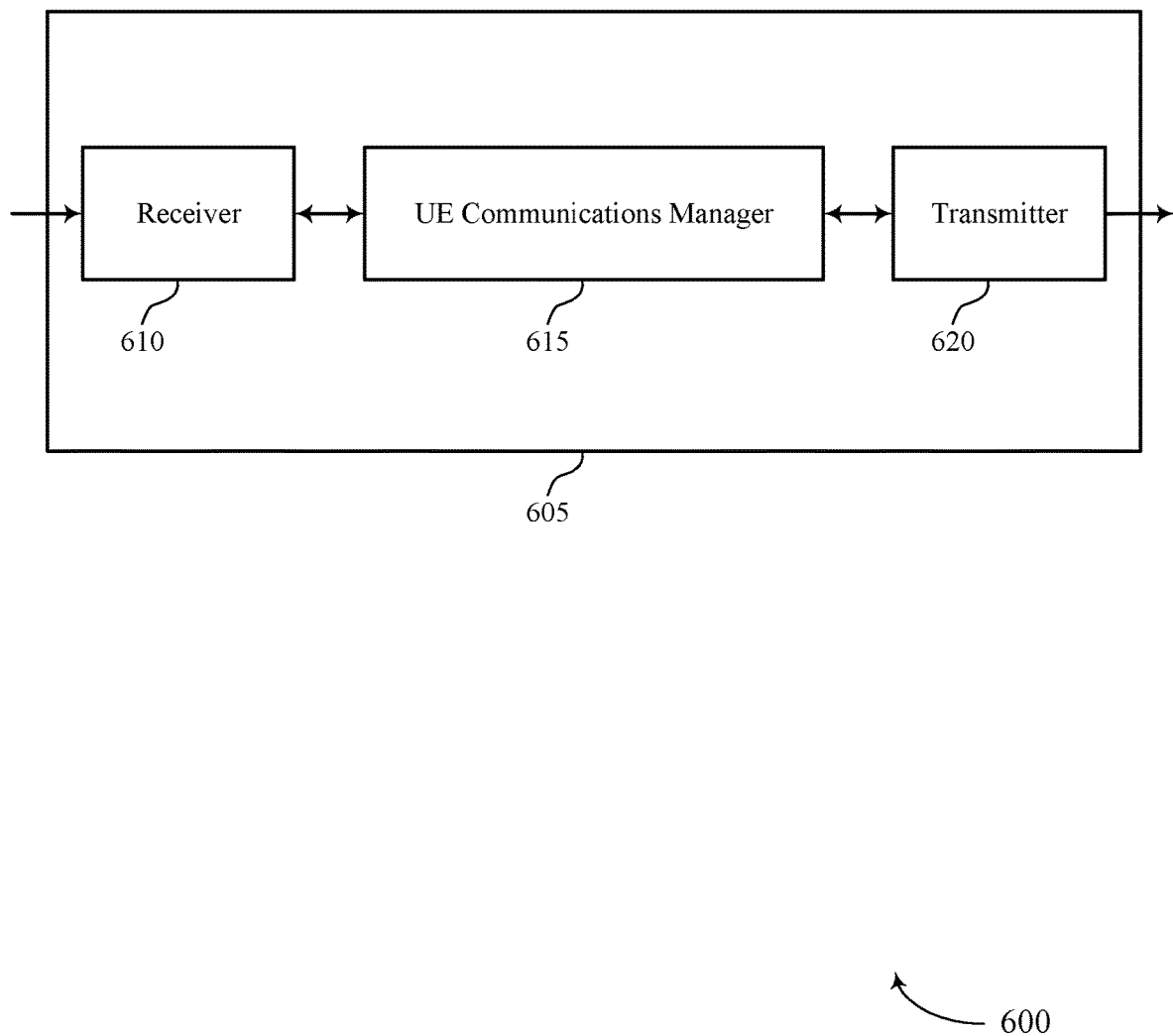
FIGS. 6 and 7 show block diagrams of devices that support waveform generation in mmW band with time domain implementation in accordance with aspects of the present disclosure.

FIG. 6 shows a block diagram 600 of a device 605 that supports waveform generation in mmW band with time domain implementation in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to waveform generation in mmW band with time domain implementation, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive control information indicating a resource allocation within a slot. In some cases, the UE communications manager 615 may identify that the slot includes a defined number of symbol periods or the defined number of symbol periods and at least one additional symbol period based on a position of the slot within a cyclic time interval that includes a defined number of slots. Subsequently, the UE communications manager 615 may transmit or receive a waveform within the slot.

Additionally or alternatively, the UE communications manager 615 may identify an operating mode of the UE. In some cases, the UE communications manager 615 may identify allowed resource allocation sizes for transmitting or receiving a waveform based on the operating mode. Subsequently, the UE communications manager 615 may transmit or receive a waveform to or from a wireless device based on the allowed resource allocation sizes. The UE communications manager 615 may be an example of aspects of the UE communications manager 910 described herein.

In some examples, the UE communications manager 615 as described herein may be implemented to realize one or more potential advantages for a UE 115. For example, based on transmitting or receiving a waveform based on a number of symbols in a slot for that waveform or based on an operating mode (e.g., with an associated allowed resource allocation sizes for the waveform), a UE 115 may more efficiently transmit or receive the waveform regardless of an SCS used for the waveform. That is, the UE 115 may transmit or receive the waveform based on different parameters than the SCS, thereby reducing complexity of the UE 115. Accordingly, the UE 115 may save power by transmitting/receiving the waveform in a more consistent manner.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
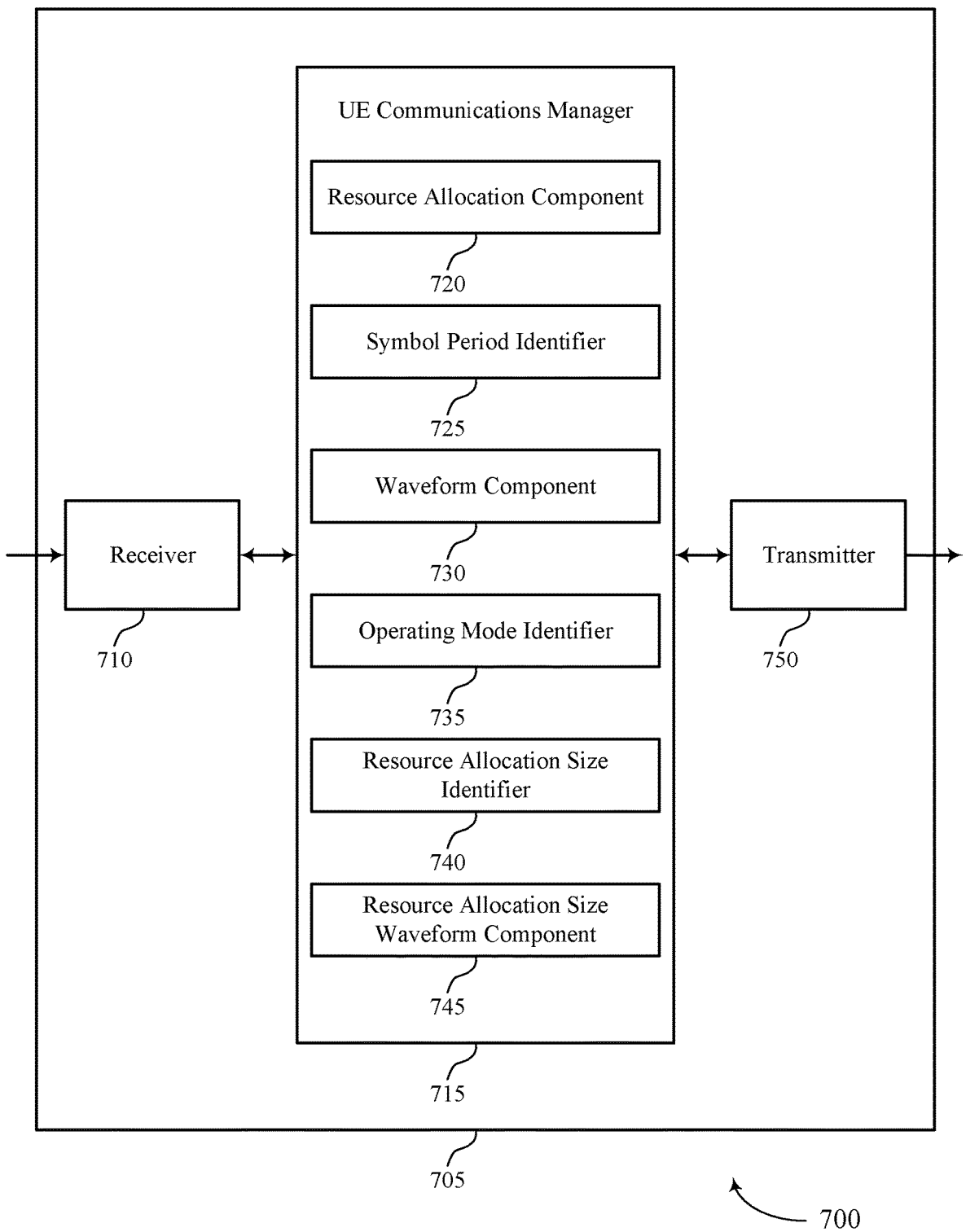

FIG. 7 shows a block diagram 700 of a device 705 that supports waveform generation in mmW band with time domain implementation in accordance with aspects of the present disclosure. The device 705 may be an example of aspects of a device 605, or a UE 115 as described herein. The device 705 may include a receiver 710, a UE communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to waveform generation in mmW band with time domain implementation, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a resource allocation component 720, a symbol period identifier 725, a waveform component 730, an operating mode identifier 735, a resource allocation size identifier 740, and a resource allocation size waveform component 745. The UE communications manager 715 may be an example of aspects of the UE communications manager 910 described herein.

The resource allocation component 720 may receive control information indicating a resource allocation within a slot.

The symbol period identifier 725 may identify that the slot includes a defined number of symbol periods or the defined number of symbol periods and at least one additional symbol period based on a position of the slot within a cyclic time interval that includes a defined number of slots.

The waveform component 730 may transmit or receive a waveform within the slot.

The operating mode identifier 735 may identify an operating mode of the UE.

The resource allocation size identifier 740 may identify allowed resource allocation sizes for transmitting or receiving a waveform based on the operating mode.

The resource allocation size waveform component 745 may transmit or receive a waveform to or from a wireless device based on the allowed resource allocation sizes.

Based on techniques for identifying a number of symbol periods in a slot for a waveform or an operating mode of a UE 115, a processor of the UE 115 (for example, controlling the receiver 710, the transmitter 750, or a transceiver 920 as described with reference to FIG. 9) may reduce signaling complexity of transmitting/receiving the waveform by generating/decoding the waveform according to the number of symbol periods or operating mode rather than other parameters of the waveform (e.g., SCS). Accordingly, the processor of the UE 115 may save processing resources by transmitting/receiving a waveform based on easily signaled or detectable parameters of the waveform.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
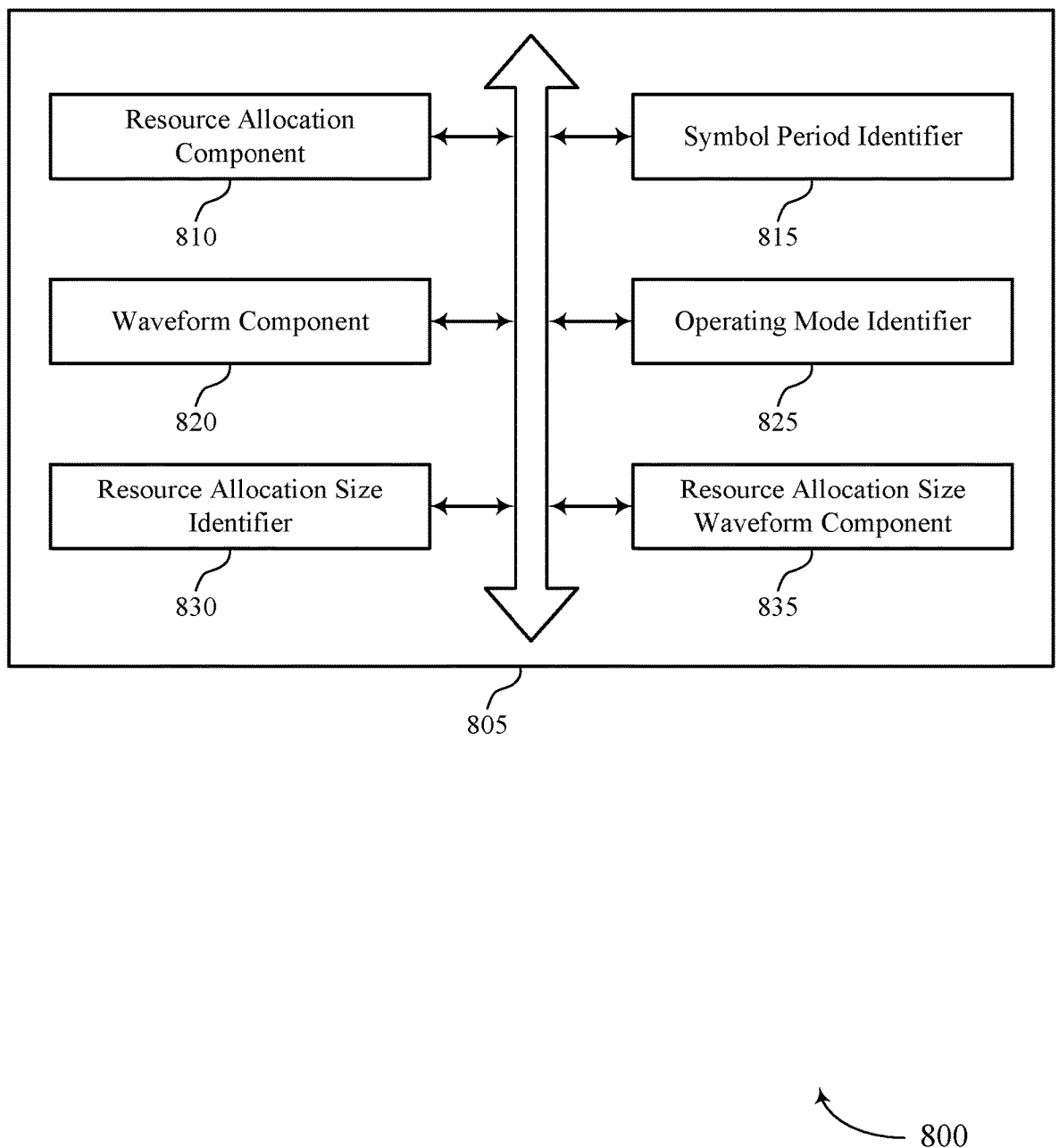
FIG. 8 shows a block diagram of a UE communications manager that supports waveform generation in mmW band with time domain implementation in accordance with aspects of the present disclosure.

FIG. 8 shows a block diagram 800 of a UE communications manager 805 that supports waveform generation in mmW band with time domain implementation in accordance with aspects of the present disclosure. The UE communications manager 805 may be an example of aspects of a UE communications manager 615, a UE communications manager 715, or a UE communications manager 910 described herein. The UE communications manager 805 may include a resource allocation component 810, a symbol period identifier 815, a waveform component 820, an operating mode identifier 825, a resource allocation size identifier 830, and a resource allocation size waveform component 835. Each of these modules may communicate, directly or indirectly, with one another (e.g., via one or more buses).

The resource allocation component 810 may receive control information indicating a resource allocation within a slot. In some examples, the control information indicating the resource allocation may include a time domain resource allocation for transmitting or receiving a waveform, and the resource allocation component 810 may interpret the time domain resource allocation in the control information based on whether the slot is identified as including the defined number of symbol periods or the defined number of symbol periods and the at least one additional symbol period.

The symbol period identifier 815 may identify that the slot includes a defined number of symbol periods or the defined number of symbol periods and at least one additional symbol period based on a position of the slot within a cyclic time interval that includes a defined number of slots. In some cases, the at least one additional symbol period may occur after a last symbol period of the defined number of symbol periods within the slot. Additionally or alternatively, the at least one additional symbol period may occur before a beginning symbol period of the defined number of symbol periods within the slot.

The waveform component 820 may transmit or receive a waveform within the slot. For example, the waveform component 820 may receive the waveform within the slot and may decode the waveform based on the identifying that the slot includes the defined number of symbol periods or the defined number of symbol periods and the at least one additional symbol period. Additionally or alternatively, the waveform component 820 may generate the waveform based on the identifying that the slot includes the defined number of symbol periods or the defined number of symbol periods and the at least one additional symbol period and may transmit the waveform within the slot. In some cases, the waveform may include a reference signal within the at least one additional symbol period, a data transmission within the at least one additional symbol period, or a combination thereof. Additionally, the waveform may be a DFT-S-OFDM waveform or a CP-OFDM waveform. In some cases, a first SCS may be used for the transmitting or receiving of each symbol period within the defined number of symbol periods and a second SCS is used for the transmitting or receiving of the at least one additional symbol period, where the first SCS and the second SCS are the same or different.

The operating mode identifier 825 may identify an operating mode of the UE. In some cases, the UE operating mode further may include a first transmitting or receiving mode, or a second transmitting or receiving mode, where the two transmitting or receiving modes correspond to different algorithms to transmit or receive a same waveform. Accordingly, a first set of allowed resource allocation sizes may be supported for the first transmitting or receiving mode, and a second set of allowed resource allocation sizes may be supported for the second transmitting or receiving mode. In some cases, the second set of allowed resource allocation sizes may be a subset of the first set of allowed resource allocation sizes. Additionally or alternatively, the second set of allowed resource allocation sizes may be different than the first set of allowed resource allocation sizes.

The resource allocation size identifier 830 may identify allowed resource allocation sizes for transmitting or receiving a waveform based on the operating mode. In some cases, the UE operating mode may be a time domain mode or a DFT-S-OFDM mode, and the waveform may be a DFT-S-OFDM waveform The resource allocation size waveform component 835 may transmit or receive the waveform to or from a wireless device based on the allowed resource allocation sizes.

Figure 9:
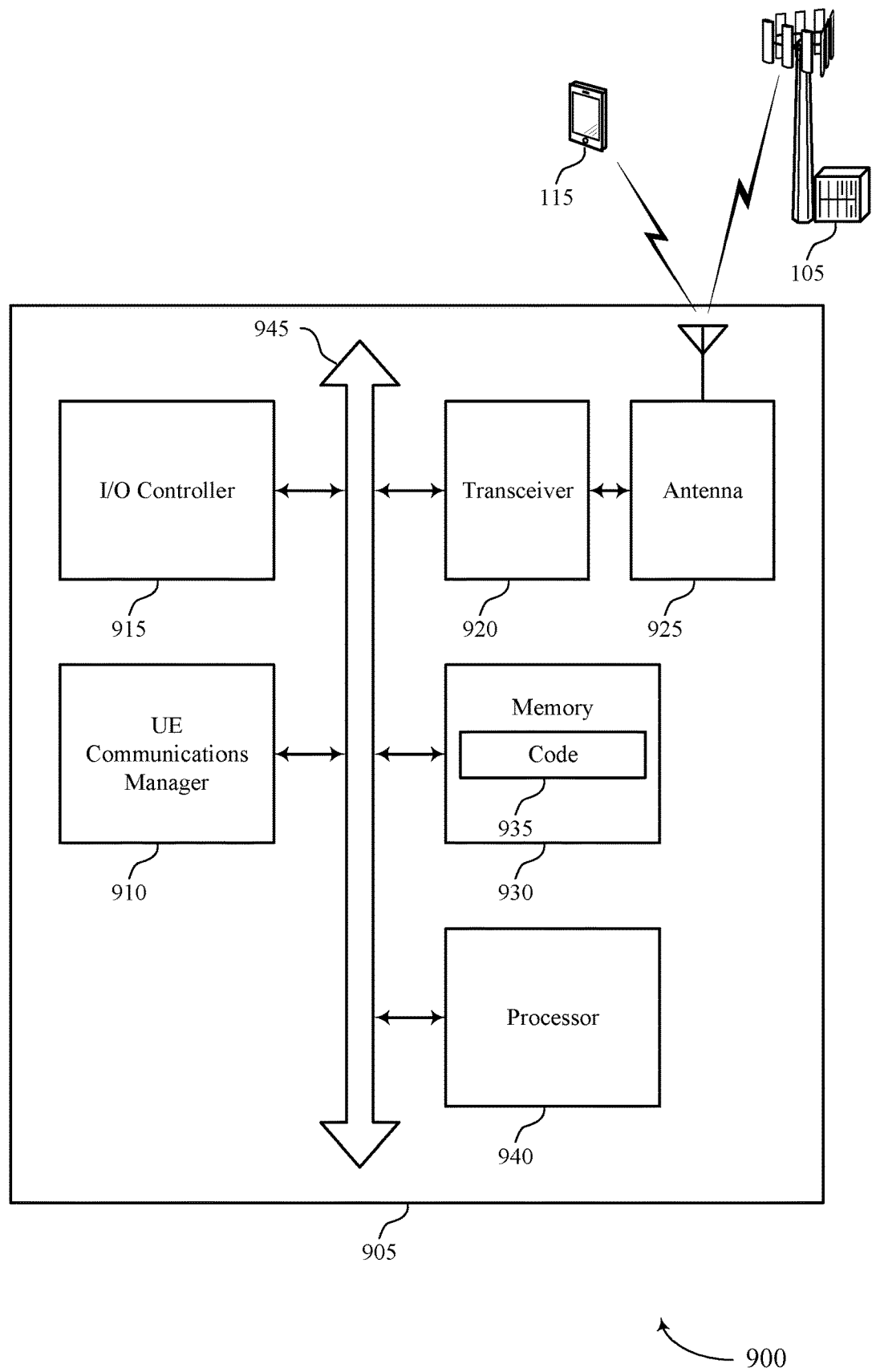
FIG. 9 shows a diagram of a system including a device that supports waveform generation in mmW band with time domain implementation in accordance with aspects of the present disclosure.

FIG. 9 shows a diagram of a system 900 including a device 905 that supports waveform generation in mmW band with time domain implementation in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive control information indicating a resource allocation within a slot. In some cases, the UE communications manager 910 may identify that the slot includes a defined number of symbol periods or the defined number of symbol periods and at least one additional symbol period based on a position of the slot within a cyclic time interval that includes a defined number of slots. Subsequently, the UE communications manager 910 may transmit or receive a waveform within the slot.

Additionally or alternatively, the UE communications manager 910 may identify an operating mode of the user equipment. In some cases, the UE communications manager 910 may identify allowed resource allocation sizes for transmitting or receiving a waveform based on the operating mode. Subsequently, the UE communications manager 910 may transmit or receive a waveform to or from a wireless device based on the allowed resource allocation sizes.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting waveform generation in mmW band with time domain implementation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
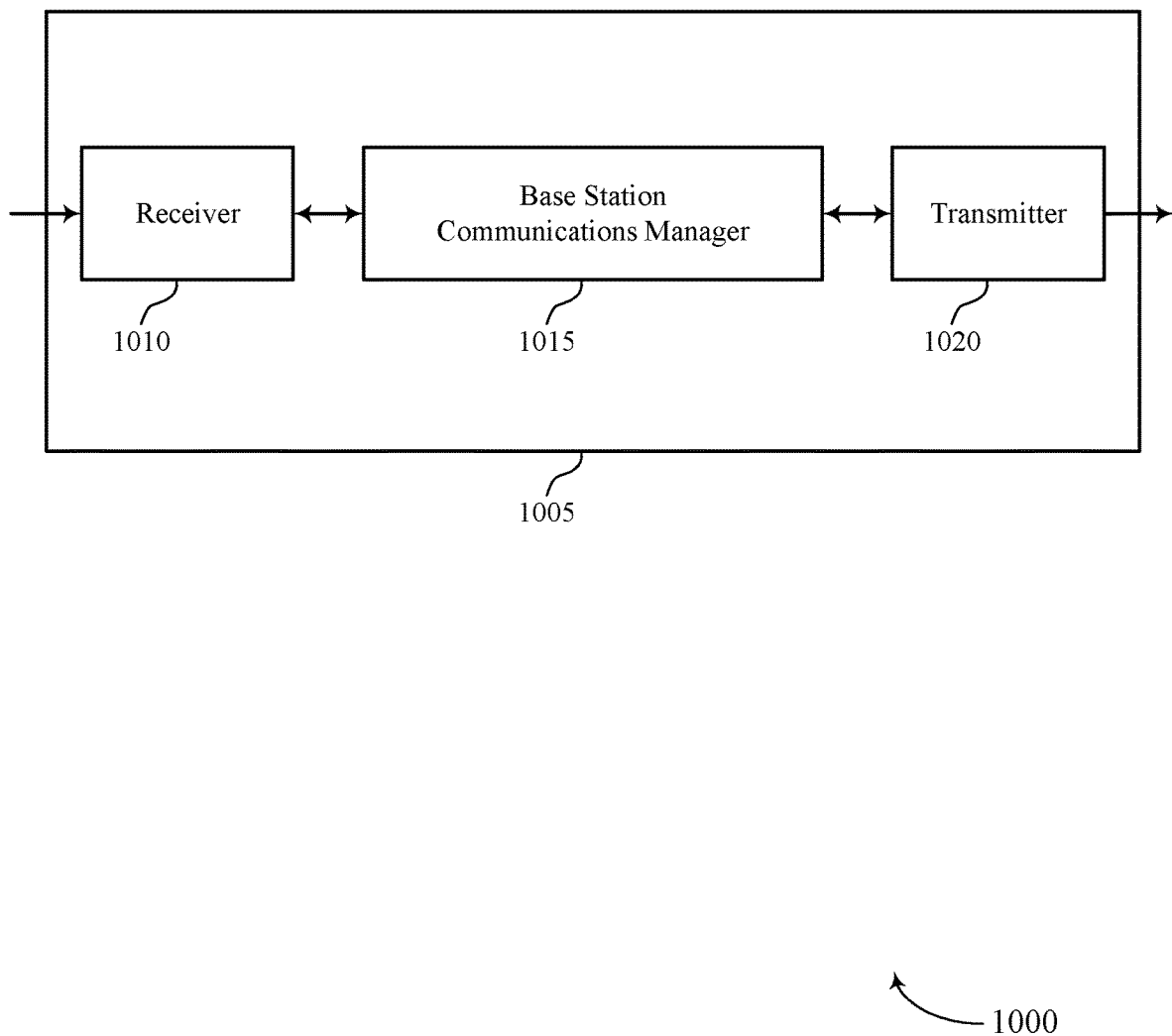
FIGS. 10 and 11 show block diagrams of devices that support waveform generation in mmW band with time domain implementation in accordance with aspects of the present disclosure.

FIG. 10 shows a block diagram 1000 of a device 1005 that supports waveform generation in mmW band with time domain implementation in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to waveform generation in mmW band with time domain implementation, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit control information indicating a resource allocation within a slot. In some cases, the base station communications manager 1015 may identify that the slot includes a defined number of symbol periods or the defined number of symbol periods and at least one additional symbol period based on a position of the slot within a cyclic time interval that includes a defined number of slots. Subsequently, the base station communications manager 1015 may transmit or receive a waveform within the slot.

Additionally or alternatively, the base station communications manager 1015 may identify an operating mode of a UE. In some cases, the base station communications manager 1015 may identify allowed resource allocation sizes for transmitting or receiving a waveform based on the operating mode. Subsequently, the base station communications manager 1015 may transmit or receive a waveform to or from the UE based on the allowed resource allocation sizes. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
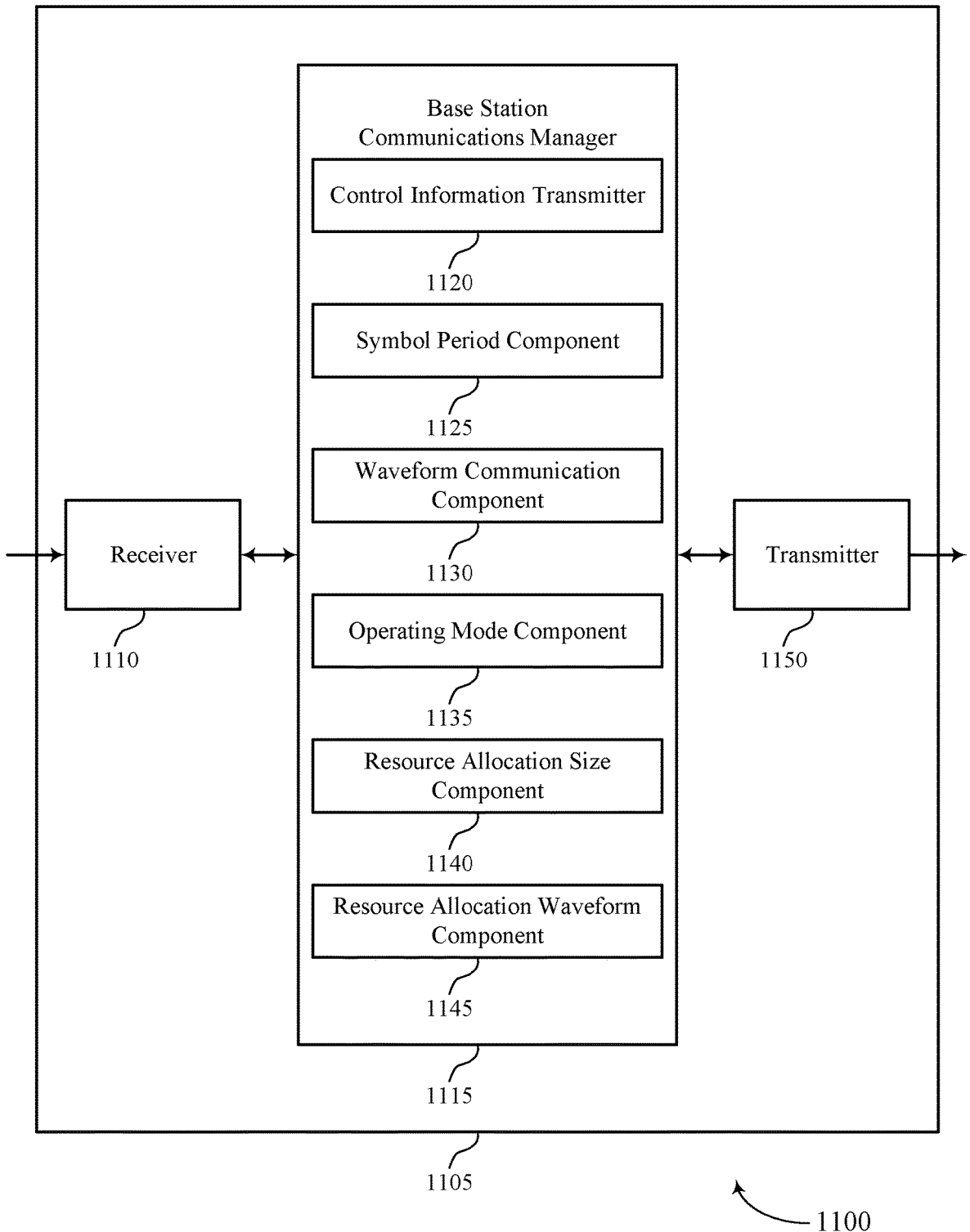

FIG. 11 shows a block diagram 1100 of a device 1105 that supports waveform generation in mmW band with time domain implementation in accordance with aspects of the present disclosure. The device 1105 may be an example of aspects of a device 1005, or a base station 105 as described herein. The device 1105 may include a receiver 1110, a base station communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to waveform generation in mmW band with time domain implementation, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a control information transmitter 1120, a symbol period component 1125, a waveform communication component 1130, an operating mode component 1135, a resource allocation size component 1140, and a resource allocation waveform component 1145. The base station communications manager 1115 may be an example of aspects of the base station communications manager 1310 described herein.

The control information transmitter 1120 may transmit control information indicating a resource allocation within a slot.

The symbol period component 1125 may identify that the slot includes a defined number of symbol periods or the defined number of symbol periods and at least one additional symbol period based on a position of the slot within a cyclic time interval that includes a defined number of slots.

The waveform communication component 1130 may transmit or receive a waveform within the slot.

The operating mode component 1135 may identify an operating mode of a UE.

The resource allocation size component 1140 may identify allowed resource allocation sizes for transmitting or receiving a waveform based on the operating mode.

The resource allocation waveform component 1145 may transmit or receive a waveform to or from the UE based on the allowed resource allocation sizes.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
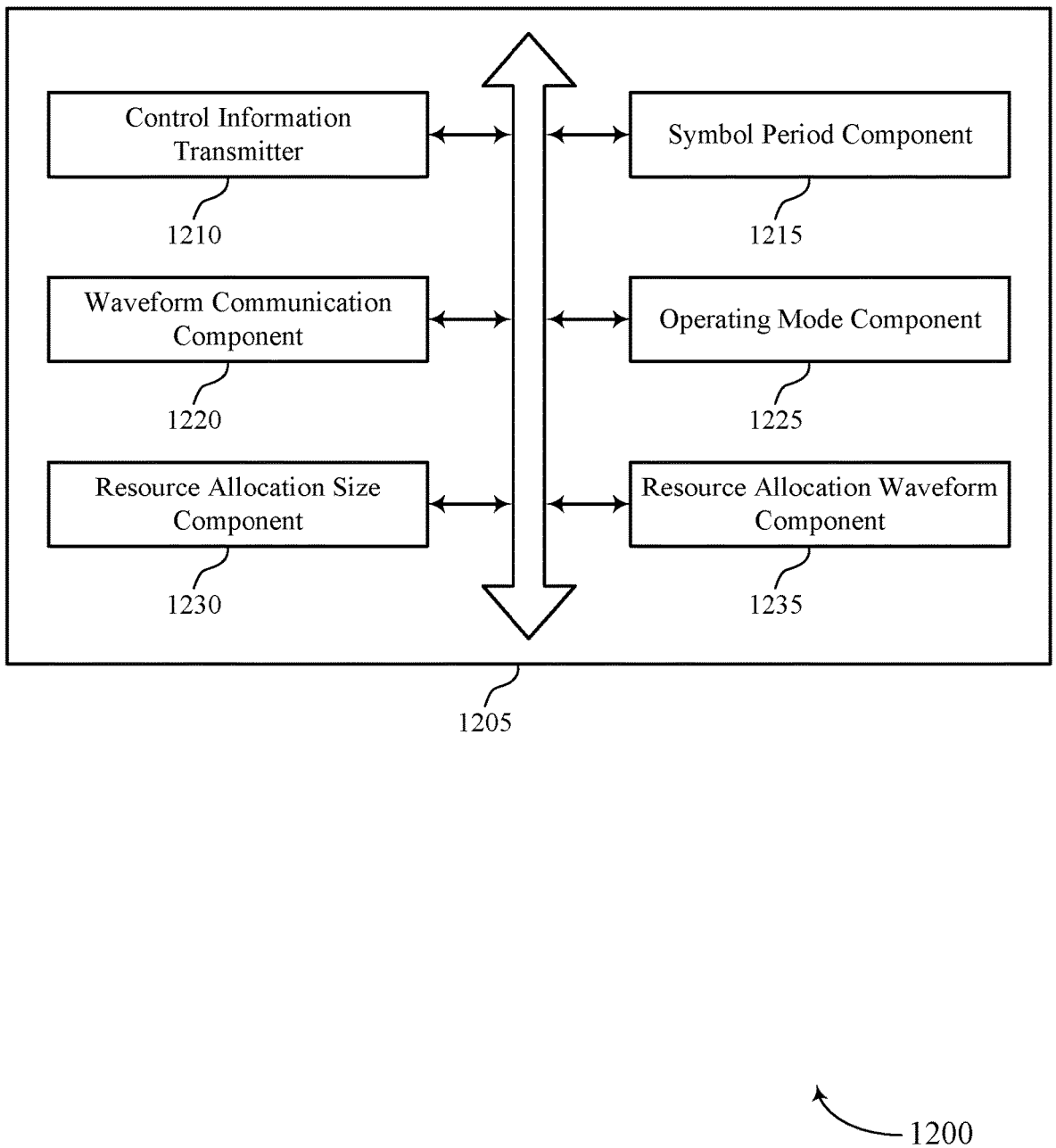
FIG. 12 shows a block diagram of a base station communications manager that supports waveform generation in mmW band with time domain implementation in accordance with aspects of the present disclosure.

FIG. 12 shows a block diagram 1200 of a base station communications manager 1205 that supports waveform generation in mmW band with time domain implementation in accordance with aspects of the present disclosure. The base station communications manager 1205 may be an example of aspects of a base station communications manager 1015, a base station communications manager 1115, or a base station communications manager 1310 described herein. The base station communications manager 1205 may include a control information transmitter 1210, a symbol period component 1215, a waveform communication component 1220, an operating mode component 1225, a resource allocation size component 1230, and a resource allocation waveform component 1235. Each of these modules may communicate, directly or indirectly, with one another (e.g., via one or more buses).

The control information transmitter 1210 may transmit control information indicating a resource allocation within a slot. In some examples, the control information indicating a resource allocation may include a time domain resource allocation for transmitting or receiving a waveform, and the control information transmitter 1210 may interpret the time domain resource allocation in the control information based on whether the slot is identified as including the defined number of symbol periods or the defined number of symbol periods and at least one additional symbol period.

The symbol period component 1215 may identify that the slot includes a defined number of symbol periods or the defined number of symbol periods and at least one additional symbol period based on a position of the slot within a cyclic time interval that includes a defined number of slots. In some cases, the at least one additional symbol period may occur after a last symbol period of the defined number of symbol periods within the slot. Additionally or alternatively, the at least one additional symbol period may occur before a beginning symbol period of the defined number of symbol periods within the slot.

The waveform communication component 1220 may transmit or receive a waveform within the slot. For example, the waveform communication component 1220 may receive the waveform within the slot and may decode the waveform based on identifying that the slot includes the defined number of symbol periods or the defined number of symbol period and the at least one additional symbol period. Additionally or alternatively, the waveform communication component 1220 may generate the waveform based on identifying that the slot includes the defined number of symbol periods or the defined number of symbol period and the at least one additional symbol period and may transmit the waveform within the slot. In some cases, the waveform may include a reference signal within the at least one additional symbol period, a data transmission within the at least one additional symbol period, or a combination thereof. Additionally, the waveform may be a DFT-S-OFDM waveform or a CP-OFDM waveform.

The operating mode component 1225 may identify an operating mode of a UE. In some cases, the UE operating mode further may include a first transmitting or receiving mode, or a second transmitting or receiving mode, where the two transmitting or receiving modes correspond to different algorithms to transmit or receive a same waveform. Accordingly, a first set of allowed resource allocation sizes may be supported for the first transmitting or receiving mode, and a second set of allowed resource allocation sizes may be supported for the second transmitting or receiving mode. In some cases, the second set of allowed resource allocation sizes may be a subset of the first set of allowed resource allocation sizes. Additionally or alternatively, the second set of allowed resource allocation sizes may be different than the first set of allowed resource allocation sizes.

The resource allocation size component 1230 may identify allowed resource allocation sizes for transmitting or receiving a waveform based on the operating mode. In some cases, the UE operating mode may be a time domain mode or a DFT-S-OFDM mode, and the waveform may be a DFT-S-OFDM waveform.

The resource allocation waveform component 1235 may transmit or receive a waveform to or from the UE based on the allowed resource allocation sizes.

Figure 13:
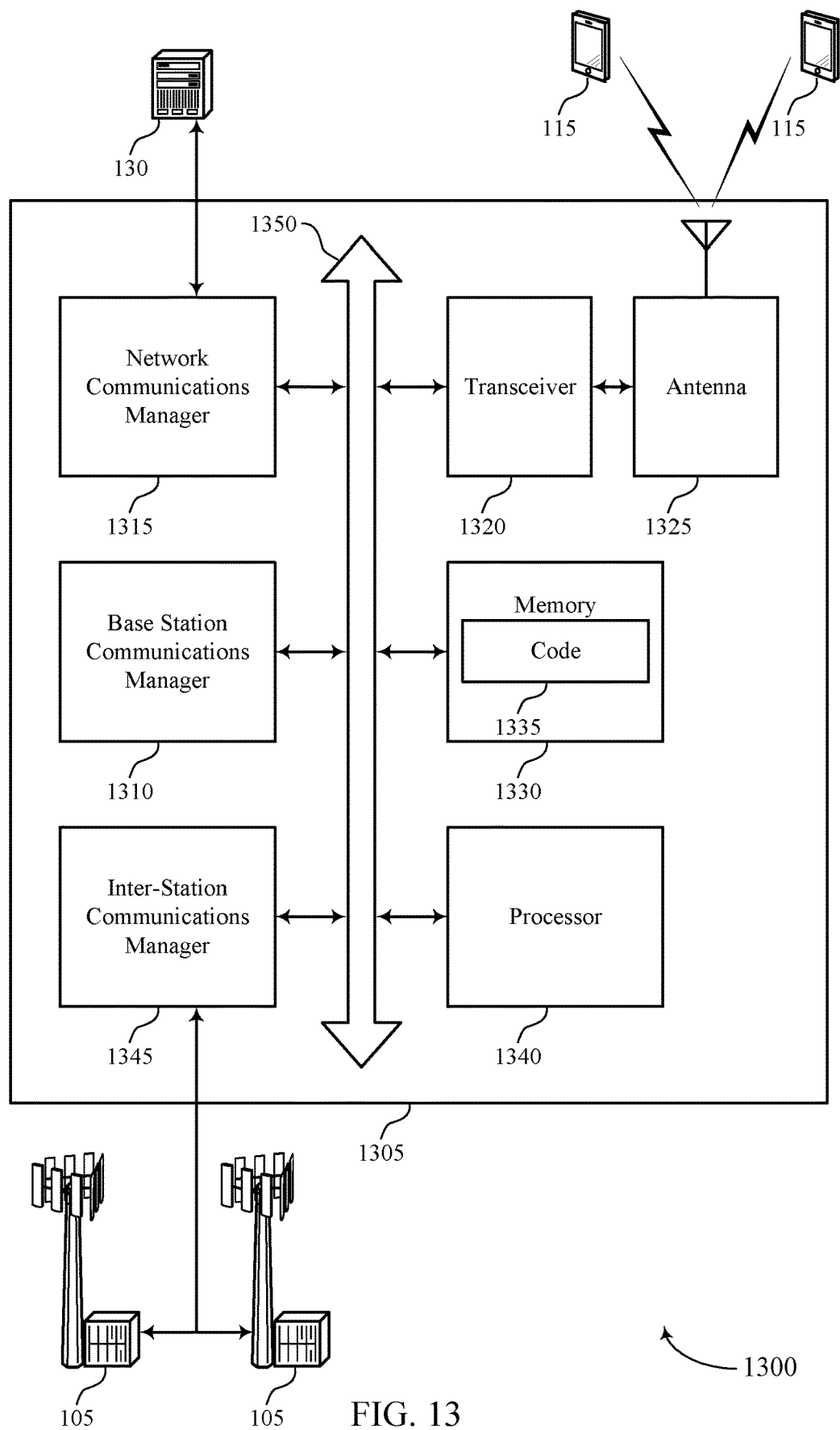
FIG. 13 shows a diagram of a system including a device that supports waveform generation in mmW band with time domain implementation in accordance with aspects of the present disclosure.

FIG. 13 shows a diagram of a system 1300 including a device 1305 that supports waveform generation in mmW band with time domain implementation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit control information indicating a resource allocation within a slot. In some cases, the base station communications manager 1310 may identify that the slot includes a defined number of symbol periods or the defined number of symbol periods and at least one additional symbol period based on a position of the slot within a cyclic time interval that includes a defined number of slots. Subsequently, the base station communications manager 1310 may transmit or receive a waveform within the slot.

Additionally or alternatively, the base station communications manager 1310 may identify an operating mode of a UE. In some cases, the base station communications manager 1310 may identify allowed resource allocation sizes for transmitting or receiving a waveform based on the operating mode. Subsequently, the base station communications manager 1310 may transmit or receive a waveform to or from the UE based on the allowed resource allocation sizes.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting waveform generation in mmW band with time domain implementation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
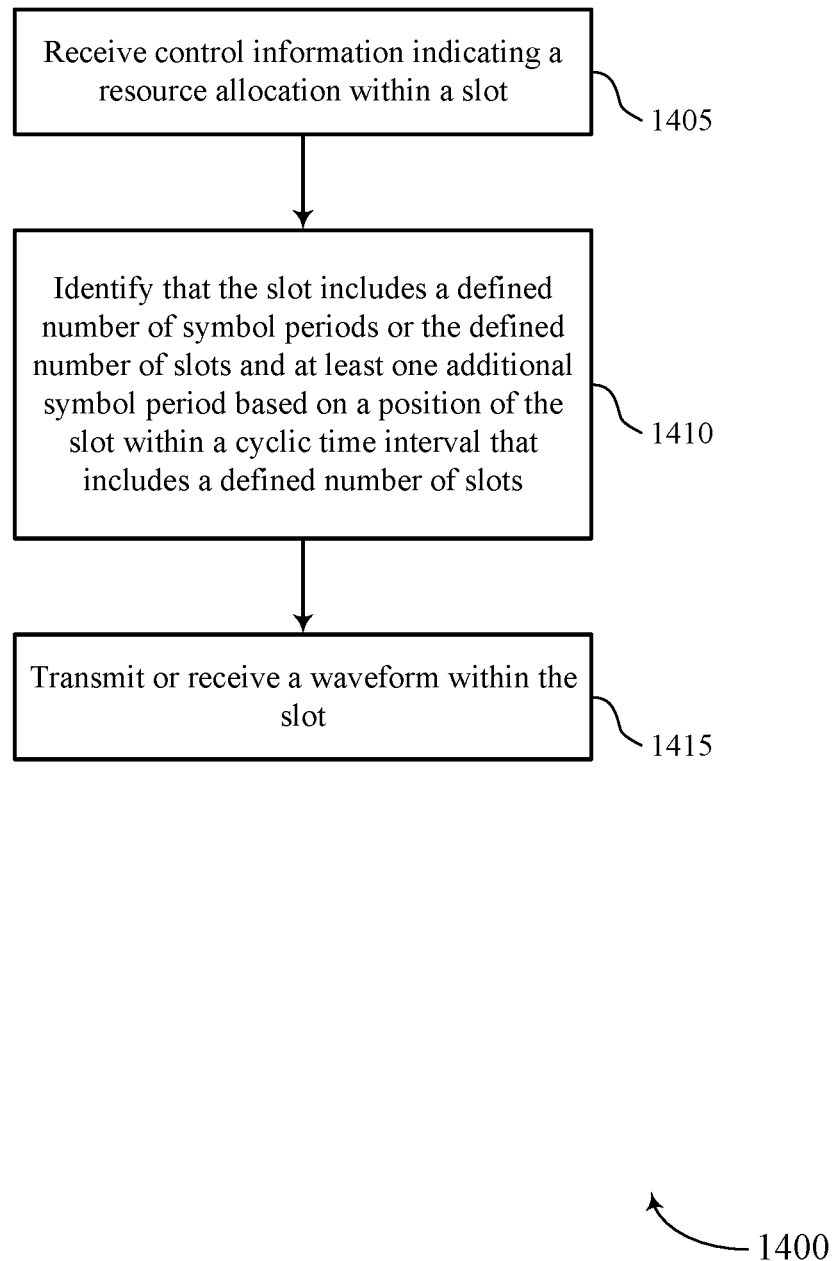
FIGS. 14 through 19 show flowcharts illustrating methods that support waveform generation in mmW band with time domain implementation in accordance with aspects of the present disclosure.

FIG. 14 shows a flowchart illustrating a method 1400 that supports waveform generation in mmW band with time domain implementation in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive control information indicating a resource allocation within a slot. The operations of 1405 may be performed according to the methods described herein. In some examples, aspects of the operations of 1405 may be performed by a resource allocation component as described with reference to FIGS. 6 through 9.

At 1410, the UE may identify that the slot includes a defined number of symbol periods or the defined number of symbol periods and at least one additional symbol period based on a position of the slot within a cyclic time interval that includes a defined number of slots. The operations of 1410 may be performed according to the methods described herein. In some examples, aspects of the operations of 1410 may be performed by a symbol period identifier as described with reference to FIGS. 6 through 9.

At 1415, the UE may transmit or receive a waveform within the slot. The operations of 1415 may be performed according to the methods described herein. In some examples, aspects of the operations of 1415 may be performed by a waveform component as described with reference to FIGS. 6 through 9.

Figure 15:
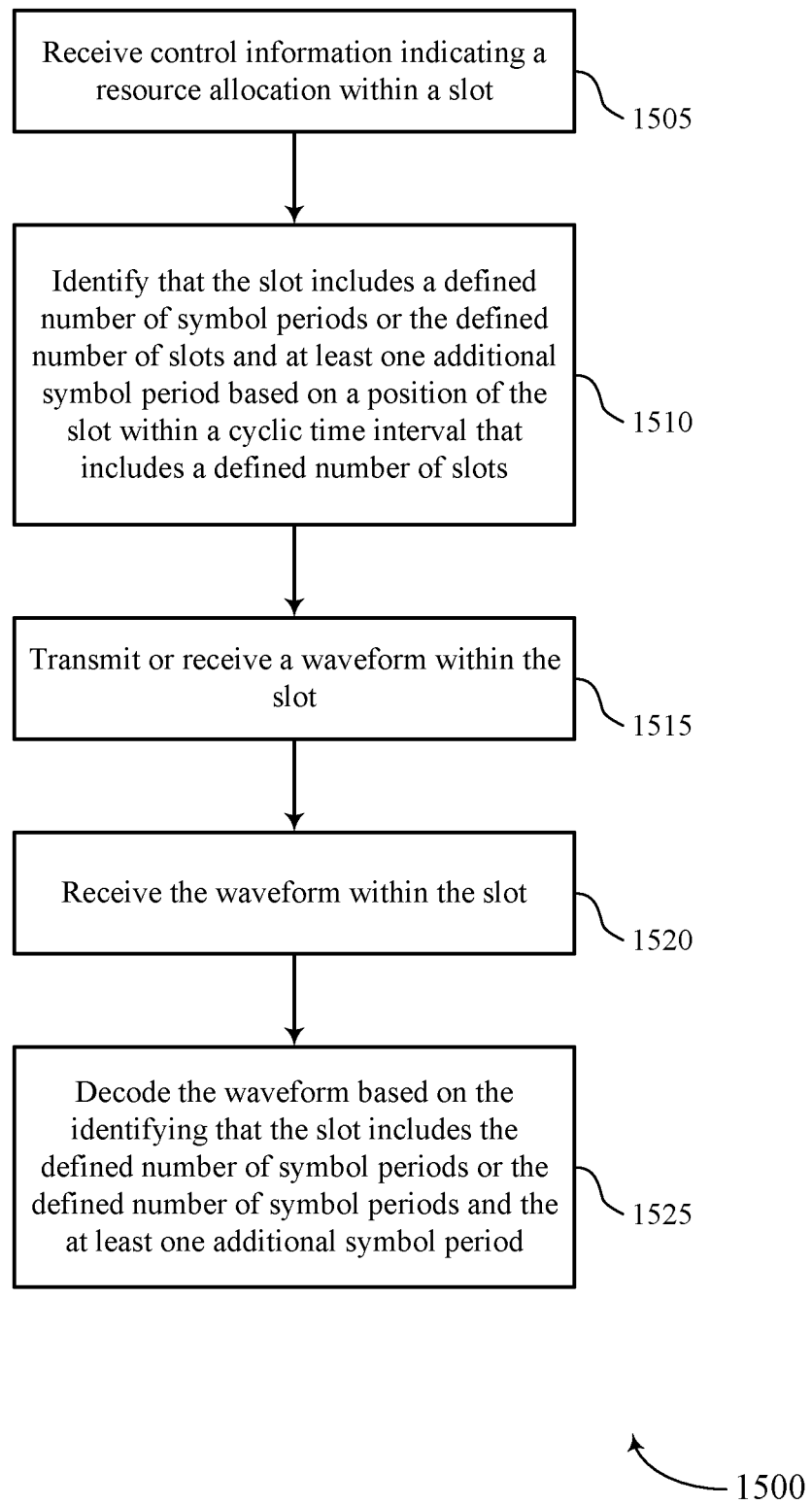

FIG. 15 shows a flowchart illustrating a method 1500 that supports waveform generation in mmW band with time domain implementation in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive control information indicating a resource allocation within a slot. The operations of 1505 may be performed according to the methods described herein. In some examples, aspects of the operations of 1505 may be performed by a resource allocation component as described with reference to FIGS. 6 through 9.

At 1510, the UE may identify that the slot includes a defined number of symbol periods or the defined number of symbol periods and at least one additional symbol period based on a position of the slot within a cyclic time interval that includes a defined number of slots. The operations of 1510 may be performed according to the methods described herein. In some examples, aspects of the operations of 1510 may be performed by a symbol period identifier as described with reference to FIGS. 6 through 9.

At 1515, the UE may transmit or receive a waveform within the slot. The operations of 1515 may be performed according to the methods described herein. In some examples, aspects of the operations of 1515 may be performed by a waveform component as described with reference to FIGS. 6 through 9.

At 1520, the UE may receive the waveform within the slot. The operations of 1520 may be performed according to the methods described herein. In some examples, aspects of the operations of 1520 may be performed by a waveform component as described with reference to FIGS. 6 through 9.

At 1525, the UE may decode the waveform based on the identifying that the slot includes the defined number of symbol periods or the defined number of symbol periods and the at least one additional symbol period. The operations of 1525 may be performed according to the methods described herein. In some examples, aspects of the operations of 1525 may be performed by a waveform component as described with reference to FIGS. 6 through 9.

Figure 16:
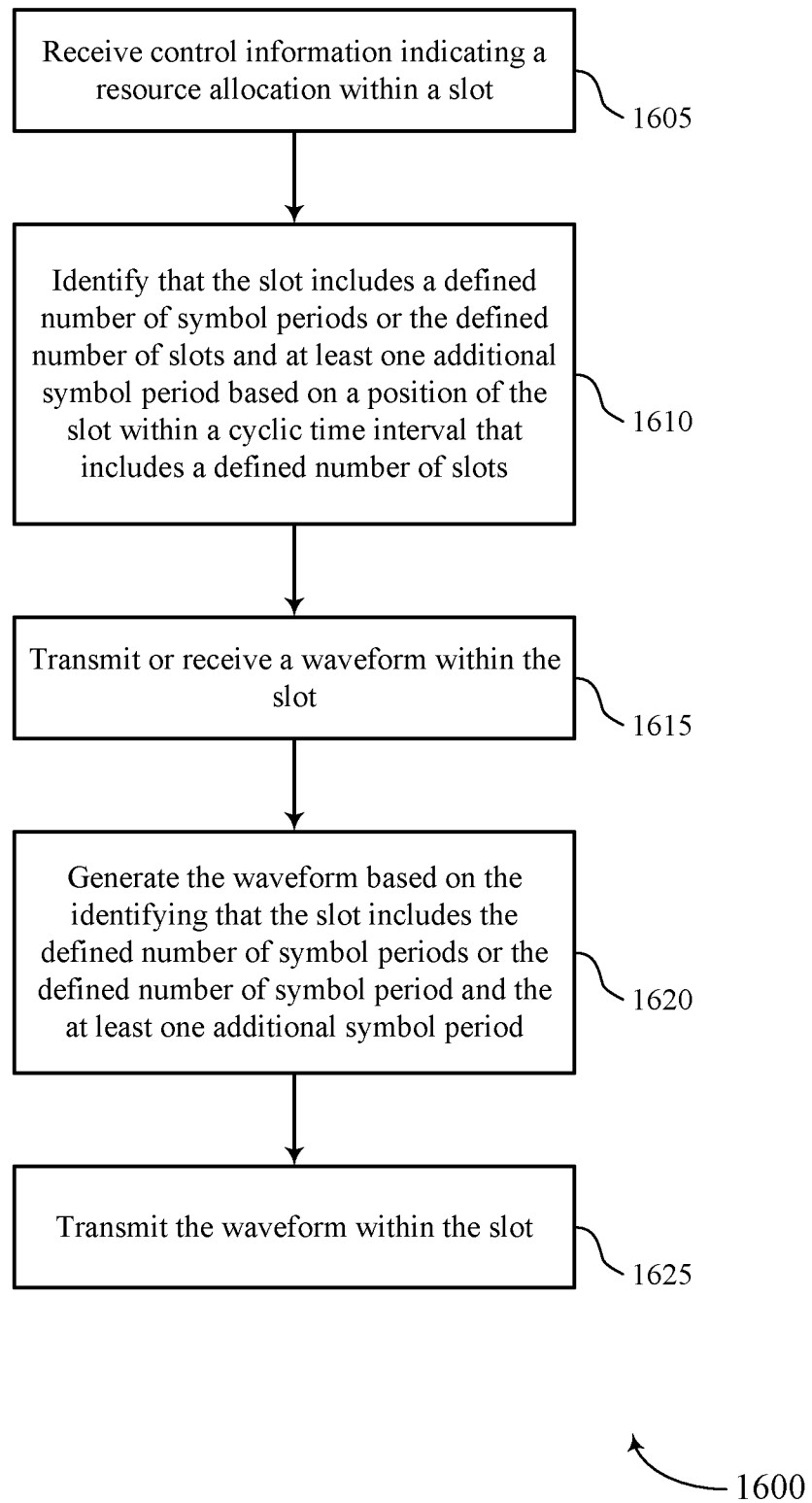

FIG. 16 shows a flowchart illustrating a method 1600 that supports waveform generation in mmW band with time domain implementation in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive control information indicating a resource allocation within a slot. The operations of 1605 may be performed according to the methods described herein. In some examples, aspects of the operations of 1605 may be performed by a resource allocation component as described with reference to FIGS. 6 through 9.

At 1610, the UE may identify that the slot includes a defined number of symbol periods or the defined number of symbol periods and at least one additional symbol period based on a position of the slot within a cyclic time interval that includes a defined number of slots. The operations of 1610 may be performed according to the methods described herein. In some examples, aspects of the operations of 1610 may be performed by a symbol period identifier as described with reference to FIGS. 6 through 9.

At 1615, the UE may transmit or receive a waveform within the slot. The operations of 1615 may be performed according to the methods described herein. In some examples, aspects of the operations of 1615 may be performed by a waveform component as described with reference to FIGS. 6 through 9.

At 1620, the UE may generate the waveform based on the identifying that the slot includes the defined number of symbol periods or the defined number of symbol period and the at least one additional symbol period. The operations of 1620 may be performed according to the methods described herein. In some examples, aspects of the operations of 1620 may be performed by a waveform component as described with reference to FIGS. 6 through 9.

At 1625, the UE may transmit the waveform within the slot. The operations of 1625 may be performed according to the methods described herein. In some examples, aspects of the operations of 1625 may be performed by a waveform component as described with reference to FIGS. 6 through 9.

Figure 17:
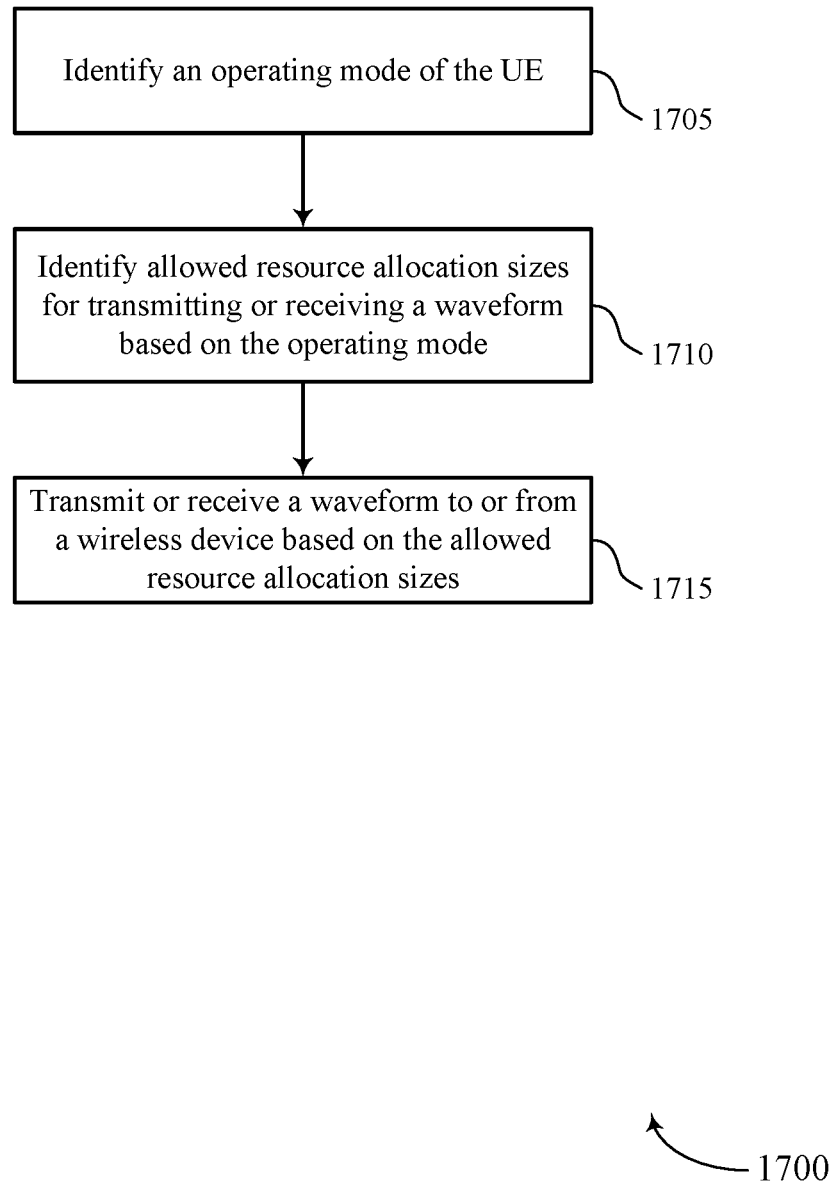

FIG. 17 shows a flowchart illustrating a method 1700 that supports waveform generation in mmW band with time domain implementation in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may identify an operating mode of the UE. The operations of 1705 may be performed according to the methods described herein. In some examples, aspects of the operations of 1705 may be performed by an operating mode identifier as described with reference to FIGS. 6 through 9.

At 1710, the UE may identify allowed resource allocation sizes for transmitting or receiving a waveform based on the operating mode. The operations of 1710 may be performed according to the methods described herein. In some examples, aspects of the operations of 1710 may be performed by a resource allocation size identifier as described with reference to FIGS. 6 through 9.

At 1715, the UE may transmit or receive a waveform to or from a wireless device based on the allowed resource allocation sizes. The operations of 1715 may be performed according to the methods described herein. In some examples, aspects of the operations of 1715 may be performed by a resource allocation size waveform component as described with reference to FIGS. 6 through 9.

Figure 18:
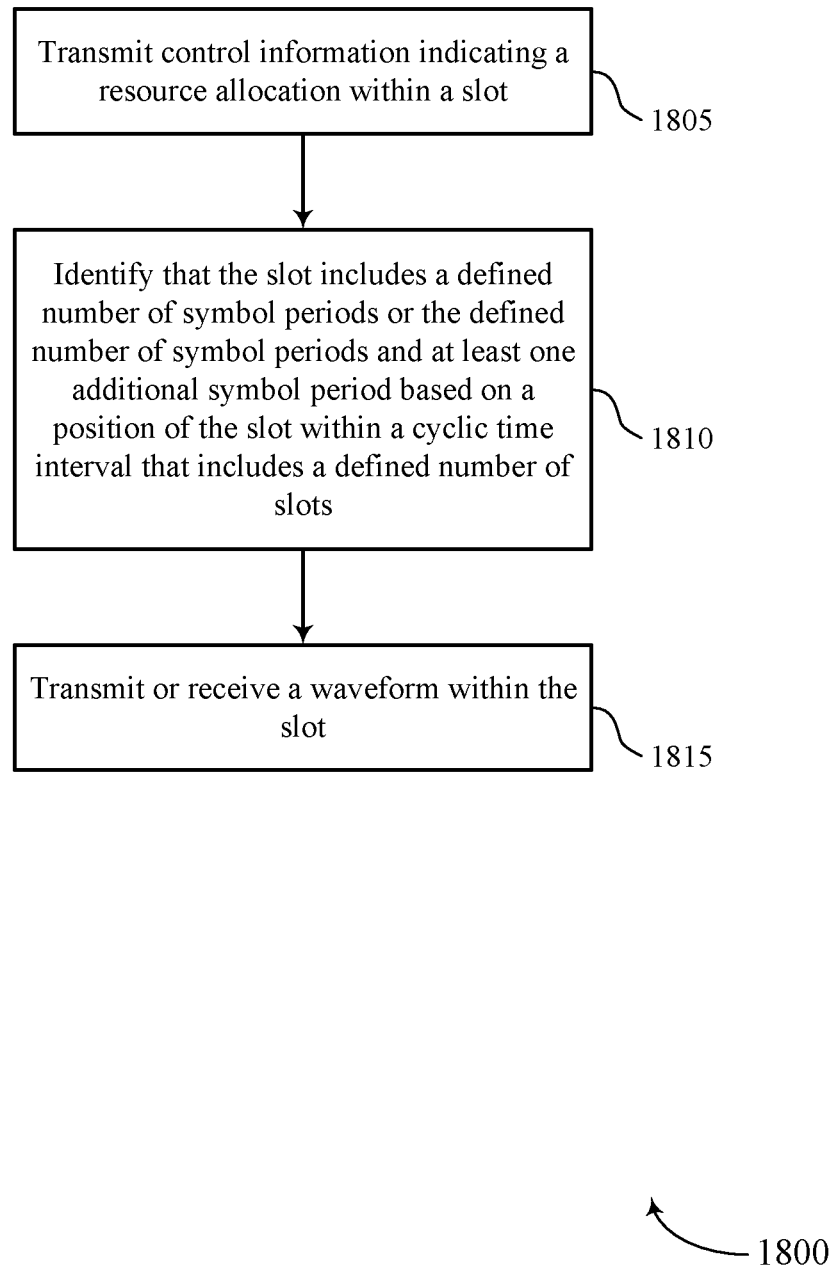

FIG. 18 shows a flowchart illustrating a method 1800 that supports waveform generation in mmW band with time domain implementation in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit control information indicating a resource allocation within a slot. The operations of 1805 may be performed according to the methods described herein. In some examples, aspects of the operations of 1805 may be performed by a control information transmitter as described with reference to FIGS. 10 through 13.

At 1810, the base station may identify that the slot includes a defined number of symbol periods or the defined number of symbol periods and at least one additional symbol period based on a position of the slot within a cyclic time interval that includes a defined number of slots. The operations of 1810 may be performed according to the methods described herein. In some examples, aspects of the operations of 1810 may be performed by a symbol period component as described with reference to FIGS. 10 through 13.

At 1815, the base station may transmit or receive a waveform within the slot. The operations of 1815 may be performed according to the methods described herein. In some examples, aspects of the operations of 1815 may be performed by a waveform communication component as described with reference to FIGS. 10 through 13.

Figure 19:
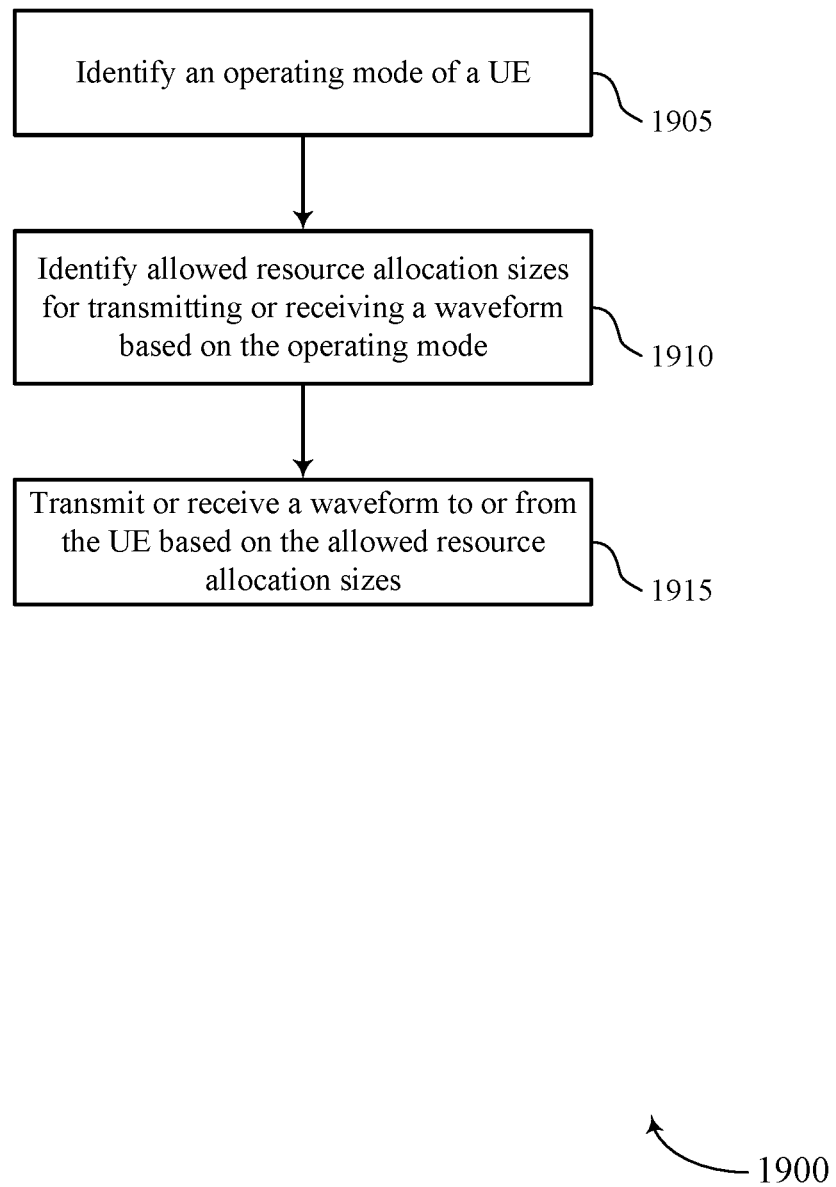

FIG. 19 shows a flowchart illustrating a method 1900 that supports waveform generation in mmW band with time domain implementation in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may identify an operating mode of a UE. The operations of 1905 may be performed according to the methods described herein. In some examples, aspects of the operations of 1905 may be performed by an operating mode component as described with reference to FIGS. 10 through 13.

At 1910, the base station may identify allowed resource allocation sizes for transmitting or receiving a waveform based on the operating mode. The operations of 1910 may be performed according to the methods described herein. In some examples, aspects of the operations of 1910 may be performed by a resource allocation size component as described with reference to FIGS. 10 through 13.

At 1915, the base station may transmit or receive a waveform to or from the UE based on the allowed resource allocation sizes. The operations of 1915 may be performed according to the methods described herein. In some examples, aspects of the operations of 1915 may be performed by a resource allocation waveform component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment, comprising:
   receiving control information indicating a resource allocation within a slot;
   identifying, based at least in part on a position of the slot within a cyclic time interval that includes a defined number of slots, that the slot includes a defined number of symbol periods and at least one additional symbol period; and
   transmitting or receiving a waveform within the slot.

2. The method of claim 1, wherein a first subcarrier spacing is used for the transmitting or receiving of each symbol period within the defined number of symbol periods and a second subcarrier spacing is used for the transmitting or receiving of the at least one additional symbol period, where the first subcarrier spacing and the second subcarrier spacing are the same or different.

3. The method of claim 1, wherein transmitting or receiving the waveform within the slot further comprises:
   receiving the waveform within the slot; and
   decoding the waveform based at least in part on the identifying that the slot includes the defined number of symbol periods and the at least one additional symbol period.

4. The method of claim 1, wherein transmitting or receiving the waveform within the slot further comprises:
   generating the waveform based at least in part on the identifying that the slot includes the defined number of symbol periods and the at least one additional symbol period; and
   transmitting the waveform within the slot.

5. The method of claim 1, wherein the waveform comprises a reference signal within the at least one additional symbol period.

6. The method of claim 1, wherein the waveform comprises a data transmission within the at least one additional symbol period.

7. The method of claim 1, wherein the at least one additional symbol period occurs after a last symbol period of the defined number of symbol periods within the slot.

8. The method of claim 1, wherein the at least one additional symbol period occurs before a beginning symbol period of the defined number of symbol periods within the slot.

9. The method of claim 1, wherein the waveform is a discrete Fourier transform spread orthogonal frequency domain multiplexing (DFT-S-OFDM) waveform or a cyclic prefix orthogonal frequency domain multiplexing (CP-OFDM) waveform.

10. The method of claim 1, wherein the control information indicating the resource allocation includes a time domain resource allocation for the transmitting or receiving, the method further comprising:
    interpreting the time domain resource allocation in the control information based at least in part on the slot including the defined number of symbol periods and the at least one additional symbol period.

11. A method for wireless communications by a base station, comprising:
    transmitting control information indicating a resource allocation within a slot;
    identifying, based at least in part on a position of the slot within a cyclic time interval that includes a defined number of slots, that the slot includes a defined number of symbol periods, and at least one additional symbol period; and transmitting or receiving a waveform within the slot.

12. The method of claim 11, wherein transmitting or receiving the waveform within the slot further comprises:
    receiving the waveform within the slot; and
    decoding the waveform based at least in part on identifying that the slot includes the defined number of symbol periods and the at least one additional symbol period.

13. The method of claim 11, wherein transmitting or receiving the waveform within the slot further comprises:
    generating the waveform based at least in part on identifying that the slot includes the defined number of symbol periods and the at least one additional symbol period; and
    transmitting the waveform within the slot.

14. The method of claim 11, wherein the waveform comprises a reference signal within the at least one additional symbol period.

15. The method of claim 11, wherein the waveform comprises a data transmission within the at least one additional symbol period.

16. The method of claim 11, wherein the at least one additional symbol period occurs after a last symbol period of the defined number of symbol periods within the slot.

17. The method of claim 11, wherein the at least one additional symbol period occurs before a beginning symbol period of the defined number of symbol periods within the slot.

18. The method of claim 11, wherein the waveform is a discrete Fourier transform spread orthogonal frequency domain multiplexing (DFT-S-OFDM) waveform or a cyclic prefix orthogonal frequency domain multiplexing (CP-OFDM) waveform.

19. The method of claim 11, wherein the control information indicating the resource allocation includes a time domain resource allocation for the transmitting or receiving, the method further comprises:
   interpreting the time domain resource allocation in the control information based at least in part on the slot including the the defined number of symbol periods and the at least one additional symbol period.

20. An apparatus for wireless communications by a user equipment, comprising: a processor, memory in electronic communication with the processor; and instructions stored in the memory and executable by the processor to cause the apparatus to:
   receive control information indicating a resource allocation within a slot;
   identify, based at least in part on a position of the slot within a cyclic time interval that includes a defined number of slots, that the slot includes a defined number of symbol periods, and at least one additional symbol period; and
   transmit or receive a waveform within the slot.

21. The apparatus of claim 20, wherein a first subcarrier spacing is used for the transmitting or receiving of each symbol period within the defined number of symbol periods and a second subcarrier spacing is used for the transmitting or receiving of the at least one additional symbol period, where the first subcarrier spacing and the second subcarrier spacing are the same or different.

22. The apparatus of claim 20, wherein the instructions to transmit or receive the waveform within the slot further are executable by the processor to cause the apparatus to:
   receive the waveform within the slot; and
   decode the waveform based at least in part on the identifying that the slot includes the defined number of symbol periods and the at least one additional symbol period.

23. The apparatus of claim 20, wherein the instructions to transmit or receive the waveform within the slot further are executable by the processor to cause the apparatus to:
   generate the waveform based at least in part on the slot including the defined number of symbol periods and the at least one additional symbol period; and
   transmit the waveform within the slot.

24. The apparatus of claim 20, wherein the control information indicating the resource allocation includes a time domain resource allocation for the transmitting or receiving, the instructions stored in the memory and executable by the processor to further cause the apparatus to:
   interpret the time domain resource allocation in the control information based at least in part on the slot including the defined number of symbol periods and the at least one additional symbol period.

25. An apparatus for wireless communications by a base station, comprising: a processor, memory in electronic communication with the processor; and
   instructions stored in the memory and executable by the processor to cause the apparatus to:
   transmit control information indicating a resource allocation within a slot;
   identify, based at least in part on a position of the slot within a cyclic time interval that includes a defined number of slots, that the slot includes a defined number of symbol periods and at least one additional symbol period; and
   transmit or receive a waveform within the slot.

26. The apparatus of claim 25, wherein the instructions to transmit or receive the waveform within the slot further are executable by the processor to cause the apparatus to:
   receive the waveform within the slot; and
   decode the waveform based at least in part on identifying that the slot includes the defined number of symbol periods and the at least one additional symbol period.

27. The apparatus of claim 25, wherein the instructions to transmit or receive the waveform within the slot further are executable by the processor to cause the apparatus to:
   generate the waveform based at least in part on identifying that the slot includes the defined number of symbol periods and the at least one additional symbol period; and
   transmit the waveform within the slot.

28. The apparatus of claim 25, wherein the control information indicating the resource allocation includes a time domain resource allocation for the transmitting or receiving, the instructions stored in the memory and executable by the processor to further cause the apparatus to:
   interpret the time domain resource allocation in the control information based at least in part on the slot including the defined number of symbol periods and the at least one additional symbol period.

29. The apparatus of claim 20, wherein the waveform comprises a reference signal within the at least one additional symbol period.

30. The apparatus of claim 20, wherein the waveform comprises a data transmission within the at least one additional symbol period.

31. The apparatus of claim 20, wherein the at least one additional symbol period occurs after a last symbol period of the defined number of symbol periods within the slot.

32. The apparatus of claim 20, wherein the at least one additional symbol period occurs before a beginning symbol period of the defined number of symbol periods within the slot.

33. The apparatus of claim 20, wherein the waveform is a discrete Fourier transform spread orthogonal frequency domain multiplexing (DFT-S-OFDM) waveform or a cyclic prefix orthogonal frequency domain multiplexing (CP-OFDM) waveform.

34. The apparatus of claim 25, wherein the waveform comprises a reference signal within the at least one additional symbol period.

35. The apparatus of claim 25, wherein the waveform comprises a data transmission within the at least one additional symbol period.

36. The apparatus of claim 25, wherein the at least one additional symbol period occurs after a last symbol period of the defined number of symbol periods within the slot.

37. The apparatus of claim 25, wherein the at least one additional symbol period occurs before a beginning symbol period of the defined number of symbol periods within the slot.

38. The apparatus of claim 25, wherein the waveform is a discrete Fourier transform spread orthogonal frequency domain multiplexing (DFT-S-OFDM) waveform or a cyclic prefix orthogonal frequency domain multiplexing (CP-OFDM) waveform.

* * * * *